(12) United States Patent
Suzuki et al.

(10) Patent No.: US 9,386,675 B2
(45) Date of Patent: Jul. 5, 2016

(54) LASER BEAM CONTROLLING DEVICE AND EXTREME ULTRAVIOLET LIGHT GENERATING APPARATUS

(71) Applicant: GIGAPHOTON INC., Tochigi (JP)

(72) Inventors: Toru Suzuki, Tochigi (JP); Osamu Wakabayashi, Tochigi (JP)

(73) Assignee: GIGAPHOTON INC., Tochigi (JP)

( * ) Notice: Subject to any disclaimer, the term of this patent is extended or adjusted under 35 U.S.C. 154(b) by 0 days.

(21) Appl. No.: 14/724,636

(22) Filed: May 28, 2015

(65) Prior Publication Data

US 2015/0264792 A1 Sep. 17, 2015

Related U.S. Application Data

(63) Continuation of application No. PCT/JP2013/081346, filed on Nov. 21, 2013.

(30) Foreign Application Priority Data

Dec. 21, 2012 (JP) .................................. 2012-279637

(51) Int. Cl.
*H05G 2/00* (2006.01)
*G02B 27/14* (2006.01)
*G02B 27/00* (2006.01)
*H01S 3/00* (2006.01)
(Continued)

(52) U.S. Cl.
CPC ............ *H05G 2/008* (2013.01); *G02B 27/0068* (2013.01); *G02B 27/141* (2013.01); *G02B 17/0892* (2013.01); *G02B 27/108* (2013.01); *H01S 3/005* (2013.01); *H01S 3/2391* (2013.01); *H05G 2/003* (2013.01)

(58) Field of Classification Search
USPC .......................................... 250/504 R; 372/20
See application file for complete search history.

(56) References Cited

U.S. PATENT DOCUMENTS

| 8,000,212 B2 | 8/2011 | Senekerimyan et al. |
| 8,283,643 B2 | 10/2012 | Partlo et al. |

(Continued)

FOREIGN PATENT DOCUMENTS

| JP | 2012-134447 A | 7/2012 |
| JP | 2012-178534 A | 9/2012 |
| JP | 2012-212641 A | 11/2012 |

OTHER PUBLICATIONS

International Search Report PCT/JP2013/081346 dated Dec. 24, 2013 with English translation.

*Primary Examiner* — Kiet T Nguyen
(74) *Attorney, Agent, or Firm* — Studebaker & Brackett PC

(57) ABSTRACT

A laser beam controlling device may include: a guide laser device; a guide laser beam wavefront adjuster provided in a beam path of the guide laser beam outputted from the guide laser device; a beam combiner configured to adjust travel directions of a laser beam outputted from a laser system and the guide laser beam outputted from the guide laser beam wavefront adjuster to coincide with each other, a both beam wavefront adjuster provided in a beam path of both the laser beam and the guide laser beam outputted from the beam combiner, a beam monitor provided in a beam path of both the laser beam and the guide laser beam outputted from the both beam wavefront adjuster, and a controller configured to control the guide laser beam wavefront adjuster and the both beam wavefront adjuster based on detection results at the beam monitor with respect to both the laser beam and the guide laser beam.

12 Claims, 21 Drawing Sheets

(51) Int. Cl.
  *G02B 17/08* (2006.01)
  *H01S 3/23* (2006.01)
  *G02B 27/10* (2006.01)

(56) References Cited

U.S. PATENT DOCUMENTS

| | | |
|---|---|---|
| 2010/0078577 A1 | 4/2010 | Moriya et al. |
| 2010/0117009 A1 | 5/2010 | Moriya et al. |
| 2010/0327192 A1 | 12/2010 | Fomenkov et al. |
| 2012/0019826 A1 | 1/2012 | Graham et al. |
| 2013/0015319 A1 | 1/2013 | Moriya et al. |
| 2013/0037693 A1 | 2/2013 | Moriya et al. |
| 2013/0105712 A1 | 5/2013 | Yanagida et al. |
| 2014/0191108 A1* | 7/2014 | Moriya ............... H05G 2/008 250/201.1 |
| 2014/0348188 A1* | 11/2014 | Suganuma ............ H01S 3/2391 372/20 |
| 2015/0334814 A1* | 11/2015 | Moriya ............... H05G 2/008 250/504 R |

* cited by examiner

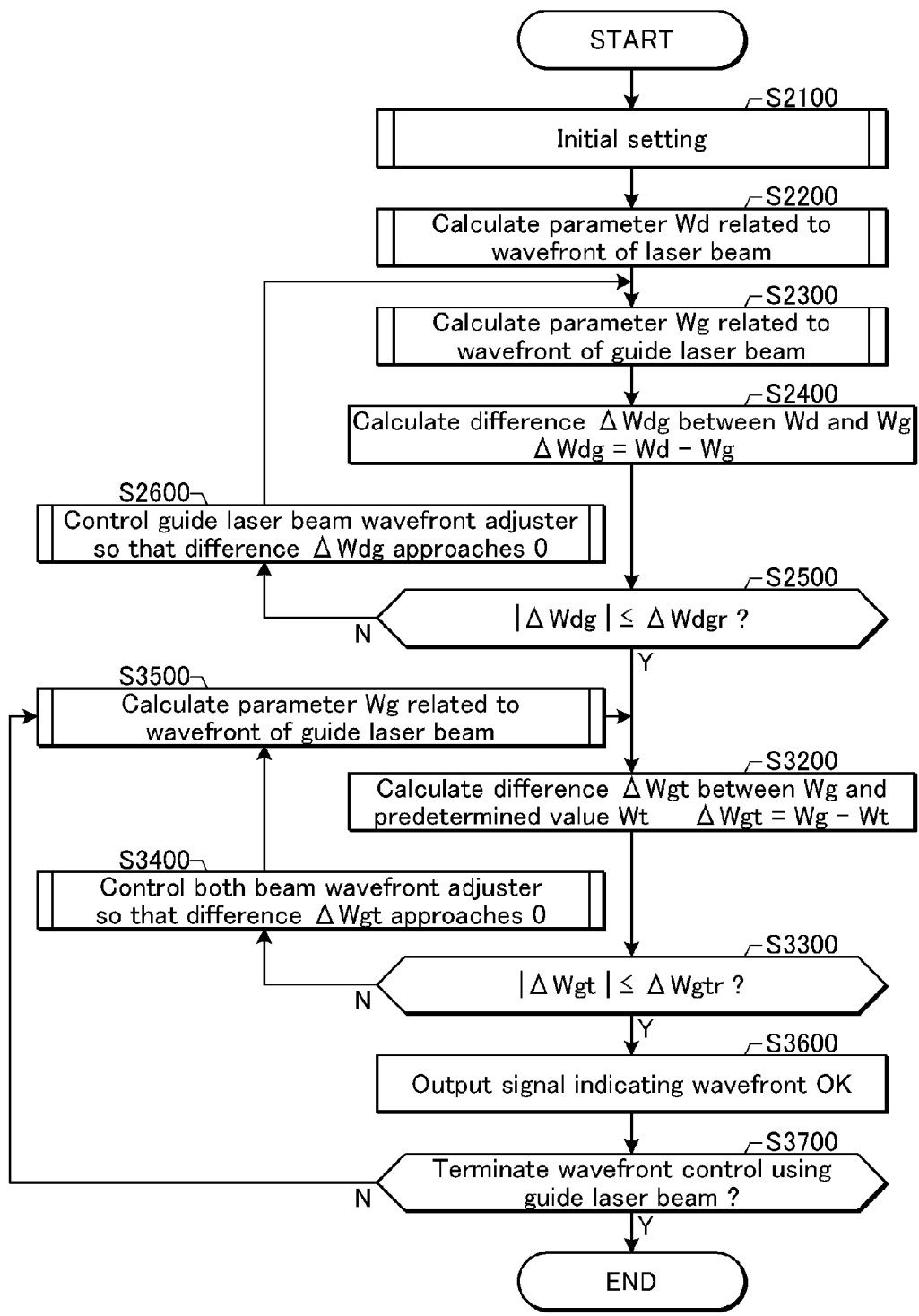

LASER BEAM CONTROLLING DEVICE AND EXTREME ULTRAVIOLET LIGHT GENERATING APPARATUS

CROSS-REFERENCE TO RELATED APPLICATIONS

This Application is a Continuation Application of PCT/JP2013/081346 filed Nov. 21, 2013, which claims priority to Japanese Patent Application No. 2012-279637 filed Dec. 21, 2012. The subject matter of each is incorporated herein by reference in entirety.

TECHNICAL FIELD

The present disclosure relates to a laser beam controlling device and an extreme ultraviolet light generating apparatus.

BACKGROUND ART

In recent years, as semiconductor processes become finer, transfer patterns for use in photolithographies of semiconductor processes have rapidly become finer. In the next generation, microfabrication at 70 nm to 45 nm, and further, microfabrication with 32 nm or less will be demanded. In order to meet the demand for microfabrication at 32 nm or less, for example, the development of an exposure apparatus in which an apparatus for generating extreme ultraviolet (EUV) light at a wavelength of approximately 13 nm is combined with a reduced projection reflective optics is expected.

As the apparatus for generating EUV light, three types of apparatuses have been proposed, which include a Laser Produced Plasma (LPP) type apparatus using plasma generated by irradiating a target material with a laser beam, a Discharge Produced Plasma (DPP) type apparatus using plasma generated by electric discharge, and a Synchrotron Radiation (SR) type apparatus using synchrotron radiation.

SUMMARY

A laser beam controlling device according to one aspect of the present disclosure may include a guide laser device configured to output a guide laser beam, a guide laser beam wavefront adjuster provided in a beam path of the guide laser beam outputted from the guide laser device, a beam combiner configured to adjust a travel direction of a laser beam outputted from a laser system and a travel direction of the guide laser beam outputted from the guide laser beam wavefront adjuster to coincide with each other, a both beam wavefront adjuster provided in a beam path of both the laser beam outputted from the beam combiner and the guide laser beam outputted from the beam combiner, a beam monitor provided in a beam path of both the laser beam outputted from the both beam wavefront adjuster and the guide laser beam outputted from the both beam wavefront adjuster, and a controller configured to control the guide laser beam wavefront adjuster and the both beam wavefront adjuster based on detection results at the beam monitor with respect to both the laser beam outputted from the both beam wavefront adjuster and the guide laser beam outputted from the both beam wavefront adjuster.

A laser beam controlling device according to another aspect of the present disclosure may include a guide laser device configured to output a guide laser beam, a laser beam wavefront adjuster provided in a beam path of a laser beam outputted from a laser system, a beam combiner configured to adjust a travel direction of the laser beam outputted from the laser beam wavefront adjuster and a travel direction of the guide laser beam outputted from the guide laser device to substantially coincide with each other, a both beam wavefront adjuster provided in a beam path of both the laser beam outputted from the beam combiner and the guide laser beam outputted from the beam combiner, a beam monitor provided in a beam path of both the laser beam outputted from the both beam wavefront adjuster and the guide laser beam outputted from the both beam wavefront adjuster, and a controller configured to control the laser beam wavefront adjuster and the both beam wavefront adjuster based on detection results at the beam monitor with respect to both the laser beam outputted from the both beam wavefront adjuster and the guide laser beam outputted from the both beam wavefront adjuster.

A laser beam controlling device according to another aspect of the present disclosure may include a guide laser device configured to output a guide laser beam, a guide laser beam wavefront adjuster provided in a beam path of the guide laser beam outputted from the guide laser device, a laser beam wavefront adjuster provided in a beam path of a laser beam outputted from a laser system, a beam combiner configured to adjust a travel direction of the laser beam outputted from the laser beam wavefront adjuster and a travel direction of the guide laser beam outputted from the guide laser beam wavefront adjuster to substantially coincide with each other, a beam monitor provided in a beam path of both the laser beam outputted from the beam combiner and the guide laser beam outputted from the beam combiner, and a controller configured to control the guide laser beam wavefront adjuster and the laser beam wavefront adjuster based on detection results at the beam monitor with respect to both the laser beam outputted from the beam combiner and the guide laser beam outputted from the beam combiner.

An extreme ultraviolet light generating apparatus according to one aspect of the present disclosure may include a laser beam controlling device, including a guide laser device configured to output a guide laser beam, a guide laser beam wavefront adjuster provided in a beam path of the guide laser beam outputted from the guide laser device, a beam combiner configured to adjust a travel direction of a laser beam outputted from a laser system and a travel direction of the guide laser beam outputted from the guide laser beam wavefront adjuster to substantially coincide with each other, a both beam wavefront adjuster provided in a beam path of both the laser beam outputted from the beam combiner and the guide laser beam outputted from the beam combiner, a beam monitor provided in a beam path of both the laser beam outputted from the both beam wavefront adjuster and the guide laser beam outputted from the both beam wavefront adjuster, and a controller configured to control the guide laser beam wavefront adjuster and the both beam wavefront adjuster based on detection results at the beam monitor with respect to both the laser beam outputted from the both beam wavefront adjuster and the guide laser beam outputted from the both beam wavefront adjuster; a chamber provided with an inlet to allow the laser beam outputted from the laser beam controlling device to enter therethrough; a target generation unit configured to output a target into the chamber; and a laser beam focusing optical system configured to focus the laser beam in the chamber.

An extreme ultraviolet light generating apparatus according to another aspect of the present disclosure may include a laser beam controlling device, including a guide laser device configured to output a guide laser beam, a laser beam wavefront adjuster provided in a beam path of a laser beam outputted from a laser system, a beam combiner configured to adjust a travel direction of the laser beam outputted from the laser beam wavefront adjuster and a travel direction of the guide laser beam outputted from the guide laser device to substantially coincide with each other, a both beam wavefront adjuster provided in a beam path of both the laser beam outputted from the beam combiner and the guide laser beam outputted from the beam combiner, a beam monitor provided in a beam path of both the laser beam outputted from the both beam wavefront adjuster and the guide laser beam outputted from the both beam wavefront adjuster, and a controller configured to control the laser beam wavefront adjuster and the both beam wavefront adjuster based on detection results at the beam monitor with respect to both the laser beam outputted from the both beam wavefront adjuster and the guide laser beam outputted from the both beam wavefront adjuster; a chamber provided with an inlet to allow the laser beam outputted from the laser beam controlling device to enter therethrough; a target generation unit configured to output a target into the chamber; and a laser beam focusing optical system configured to focus the laser beam in the chamber.

An extreme ultraviolet light generating apparatus according to another aspect of the present disclosure may include a laser beam controlling device, including a guide laser device configured to output a guide laser beam, a guide laser beam wavefront adjuster provided in a beam path of the guide laser beam outputted from the guide laser device, a laser beam wavefront adjuster provided in a beam path of a laser beam outputted from a laser system, a beam combiner configured to adjust a travel direction of the laser beam outputted from the laser beam wavefront adjuster and a travel direction of the guide laser beam outputted from the guide laser beam wavefront adjuster to substantially coincide with each other, a beam monitor provided in a beam path of both the laser beam outputted from the beam combiner and the guide laser beam outputted from the beam combiner, and a controller configured to control the guide laser beam wavefront adjuster and the laser beam wavefront adjuster based on detection results at the beam monitor with respect to both the laser beam outputted from the beam combiner and the guide laser beam outputted from the beam combiner; a chamber provided with an inlet to allow the laser beam outputted from the laser beam controlling device to enter therethrough; a target generation unit configured to output a target into the chamber; and a laser beam focusing optical system configured to focus the laser beam in the chamber.

BRIEF DESCRIPTION OF DRAWINGS

Hereinafter, various embodiments of the present disclosure will be described, as mere examples, with reference to the accompanying drawings.

FIG. 5 is a flowchart showing an exemplary operation of a controller in the first embodiment.

DESCRIPTION OF EMBODIMENTS

Figure 1:
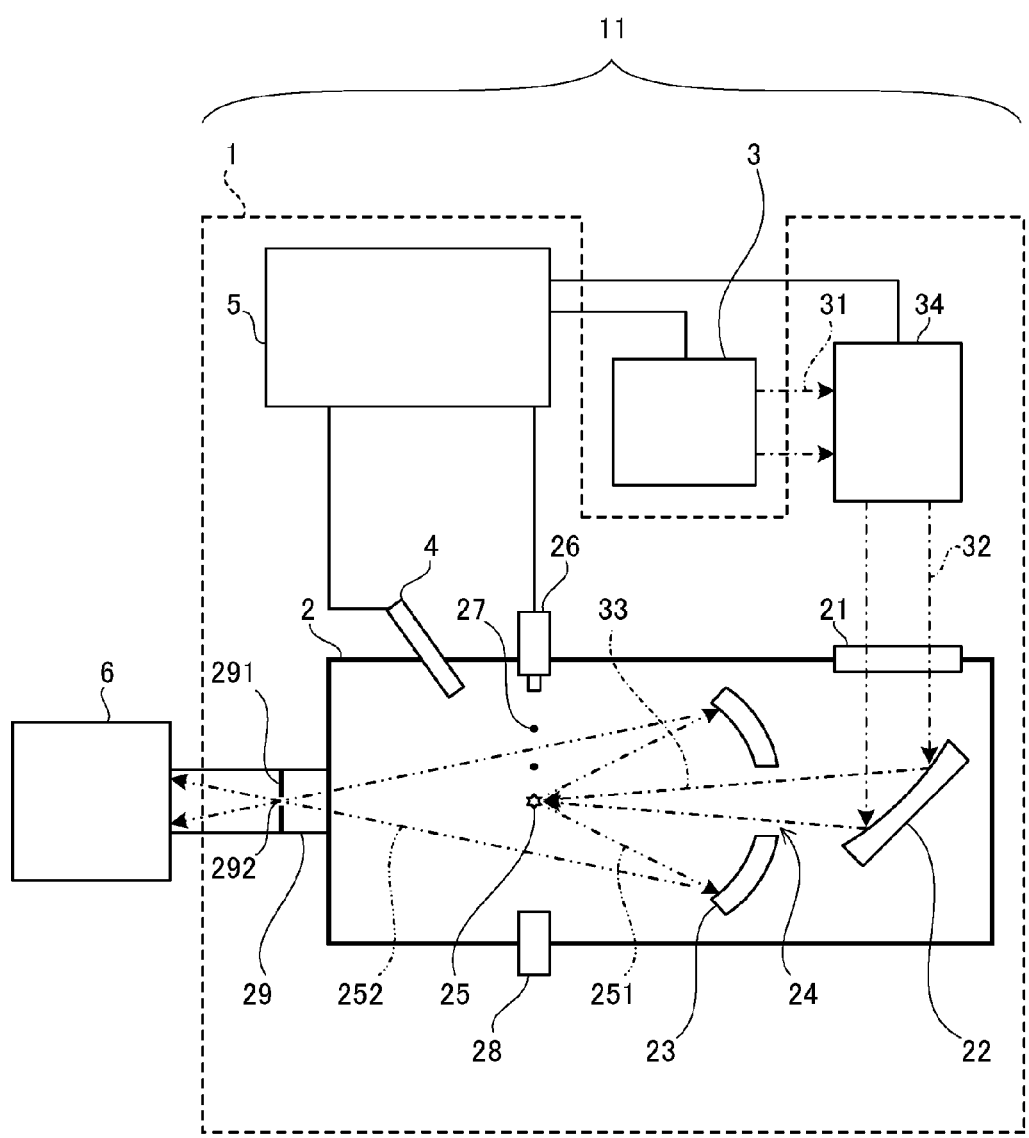
FIG. 1 schematically illustrates a configuration of an exemplary LPP type EUV light generation system.

Hereinafter, various embodiments of the present disclosure will be described in detail with reference to the drawings. The embodiments to be described below represent some examples of the present disclosure, and do not limit the scope of the present disclosure. Further, the configuration(s) and operation(s) described in each embodiment are not all essential as the configuration(s) and operation(s) of the present disclosure. Corresponding elements are referenced by corresponding reference symbols, and duplicate descriptions thereof will be omitted herein.

<Contents>
1. Overview
2. Overview of EUV Light Generation System
   2.1 Configuration
   2.2 Operation
3. EUV Light Generation System Including Wavefront Adjusters (First Embodiment)
   3.1 Configuration
   3.2 Mechanism
   3.3 Operation
      3.3.1 Main Flow
      3.3.2 Initial Setting (Details of S2100)
      3.3.3 Calculation of Wd (Details of S2200)
      3.3.4 Calculation of Wg (Details of S2300)
      3.3.5 Control of Guide Laser Beam Wavefront Adjuster (Details of S2600)
      3.3.6 Control of Both Beam Wavefront Adjuster (Details of S3400)
   3.4 Examples of Beam Monitor
      3.4.1 Detecting Beam Width at Two Different Positions
      3.4.2 Detecting Beam Width and Spot width
      3.4.3 Shack-Hartmann Wavefront Sensor
      3.4.4 Combination of Shack-Hartmann Wavefront Sensor and Beam Profiler
   3.5 Examples of Wavefront Adjuster
      3.5.1 Combination of Concave Lens and Convex Lens
      3.5.2 Using VRM
      3.5.3 Using Deformable Mirror
      3.5.4 Combination of Off-Axis Paraboloidal Convex Mirror and Off-Axis Paraboloidal Concave Mirror
4. EUV Light Generation System where Wavefront of Laser Beam Is Adjusted to Coincide with Wavefront of Guide Laser Beam (Second Embodiment)
5. EUV Light Generation System where Wavefront of Laser Beam and Wavefront of Guide Laser Beam Are Adjusted (Third Embodiment)
6. EUV Light Generation System where Wavefront and Beam Width Are Adjusted (Fourth Embodiment)
   6.1 Configuration
   6.2 Operation
      6.2.1 Main Flow
      6.2.2 Initial Setting (Details of S2150)
      6.2.3 Calculation of Dg (Details of S2700)
      6.2.4 Control of Both Beam Wavefront Adjuster (Details of S3000)
      6.2.5 Control of Second Both Beam Wavefront Adjuster (Details of S3450)
7. Laser System (Fifth Embodiment)
8. Configuration of Controller 1. Overview In an LPP type EUV light generation system, a target material outputted into a chamber may be irradiated with a laser beam focused after being outputted from a laser system to thereby be turned into plasma. Then, light including EUV light may be emitted from the plasma. The emitted EUV light may be collected by an EUV collector mirror provided inside the chamber, and outputted to an external apparatus such as an exposure apparatus.

Optical elements provided in a laser beam path from the laser system to the chamber may be heated as the optical elements absorb energy of the laser beam. As a result, the optical elements may deform and the wavefront of the laser beam may fluctuate. When the wavefront of the laser beam fluctuates, a focus position of the laser beam may be changed as well, and the output of the EUV light to the exposure apparatus may be unstable.

Here, it can be considered that a wavefront adjuster is arranged in the laser beam path and the wavefront of the laser beam is adjusted by controlling the wavefront adjuster. Further, it can be considered that a guide laser beam is made incident on the wavefront adjuster and the wavefront of the guide laser beam outputted from the wavefront adjuster is detected on the downstream side of the optical elements, thereby controlling the wavefront adjuster based on the detection results. Thus, the wavefront adjuster can be controlled even while the output of the laser beam is stopped.

However, in order to divide the laser beam and the guide laser beam, or in order to provide different gains to the laser beam and the guide laser beam in the amplifier, the laser beam and the guide laser beam may include different wavelength components from each other. In that case, even when the wavefronts of the laser beam and the guide laser beam are adjusted to coincide with each other on the upstream side of the optical elements, the wavefronts of the laser beam and the guide laser beam may not coincide with each other on the downstream side of the optical elements due to an influence of diffraction of light. Therefore, even when the wavefront adjuster is controlled based on the wavefront of the guide laser beam while the output of the laser beam is stopped, the wavefront of the laser beam, when the output thereof is started, may not be a desired value.

According to one aspect of the present disclosure, a guide laser beam wavefront adjuster may be provided in the beam path of the guide laser beam outputted from the guide laser device. The laser beam outputted from the laser system and the guide laser beam outputted from the guide laser beam wavefront adjuster may be combined with each other by a beam combiner. A both beam wavefront adjuster may be provided in a beam path of the laser beam outputted from the beam combiner and the guide laser beam outputted from the beam combiner. Then, the laser beam and the guide laser beam outputted from the both beam wavefront adjuster may be made incident on the optical elements, and the wavefronts of these beams outputted from the optical elements may be detected.

With this configuration, the guide laser beam wavefront adjuster may be controlled so that the wavefronts of the laser beam and the guide laser beam coincide with each other on the downstream side of the optical elements. Thereafter, the both beam wavefront adjuster may be controlled based on the wavefront of the guide laser beam even while the output of the laser beam is stopped. Accordingly, the wavefront of the laser beam can be adjusted to be a desired value.

2. Overview of EUV Light Generation System

2.1 Configuration

FIG. 1 schematically illustrates a configuration of an exemplary LPP type EUV light generation system. An EUV light generation apparatus 1 may be used with at least one laser system 3. In the present disclosure, a system that includes the EUV light generation apparatus 1 and the laser system 3 may be referred to as an EUV light generation system 11. As shown in FIG. 1 and described in detail below, the EUV light generation apparatus 1 may include a chamber 2 and a target generation unit 26. The chamber 2 may be sealed airtight. The target generation unit 26 may be mounted onto the chamber 2 to penetrate a wall of the chamber 2. A target material to be outputted from the target generation unit 26 may include, but is not limited to, tin, terbium, gadolinium, lithium, xenon, or the combination of any two or more of them.

The chamber 2 may have at least one through-hole in its wall. A window 21 may be provided on the through-hole, and a pulse laser beam 32 outputted from the laser system 3 may travel through the window 21. An EUV collector mirror 23 having a spheroidal reflective surface, for example, may be provided in the chamber 2. The EUV collector mirror 23 may have first and second focusing points. The EUV collector mirror 23 may have, on the surface thereof, a multi-layered reflective film in which molybdenum and silicon are alternately laminated, for example. The EUV collector mirror 23 may be preferably positioned such that the first focusing point lies in a plasma generation region 25 and the second focusing point lies in an intermediate focus (IF) region 292. If necessary, the EUV collector mirror 23 may have a through-hole 24 at the center thereof, and a pulse laser beam 33 may travel through the through-hole 24.

The EUV light generation apparatus 1 may include an EUV light generation controller 5, a target sensor 4, and the like. The target sensor 4 may have an imaging function and may be configured to detect the presence, the trajectory, the position, the speed, etc. of a target 27.

The EUV light generation apparatus 1 may include a connection part 29 for allowing the interior of the chamber 2 to be in communication with the interior of the exposure apparatus 6. A wall 291 having an aperture may be provided in the connection part 29. The wall 291 may be positioned such that the aperture is positioned at the second focusing point of the EUV collector mirror 23.

Further, the EUV light generation apparatus 1 may also include a laser beam direction control unit 34, a laser beam focusing mirror 22, a target collector 28 for collecting targets 27, and the like. The laser beam direction control unit 34 may include an optical element for defining the travel direction of a laser beam and an actuator for adjusting the position, the posture, etc. of the optical element.

2.2 Operation

With continued reference to FIG. 1, a pulse laser beam 31 outputted from the laser system 3 may pass through the laser beam direction control unit 34, travel through the window 21 as the pulse laser beam 32, and enter the chamber 2. The pulse laser beam 32 may travel inside the chamber 2 along at least one laser beam path, be reflected by the laser beam focusing mirror 22, and strike at least one target 27 as the pulse laser beam 33.

The target generation unit 26 may be configured to output the target(s) 27 toward the plasma generation region 25 in the chamber 2. The target 27 may be irradiated with at least one pulse of the pulse laser beam 33. The target 27 having been irradiated with the pulse laser beam may be turned into plasma, and radiated light 251 may be emitted from the plasma. The EUV collector mirror 23 may reflect EUV light included in the radiated light 251 with higher reflectance as compared with light of other wavelength regions. Reflected light 252 including the EUV light, which is reflected by the EUV collector mirror 23, may be focused on the intermediate focus region 292 and be outputted to the exposure apparatus 6. Here, one target 27 may be irradiated with multiple pulses included in the pulse laser beam 33.

The EUV light generation controller 5 may be configured to integrally control the whole EUV light generation system 11. The EUV light generation controller 5 may be configured to process image data of the target 27 captured by the target sensor 4, and the like. Further, the EUV light generation controller 5 may be configured to control the timing at which the target 27 is outputted, the direction into which the target 27 is outputted, and the like. Furthermore, the EUV light generation controller 5 may be configured to control the timing at which the laser system 3 oscillates, the direction in which the pulse laser beam 32 travels, the position at which the pulse laser beam 33 is focused, and the like. The various controls mentioned above are merely examples, and other controls may be added as necessary.

3. EUV Light Generation System Including Wavefront Adjusters (First Embodiment)

3.1 Configuration

Figure 2:
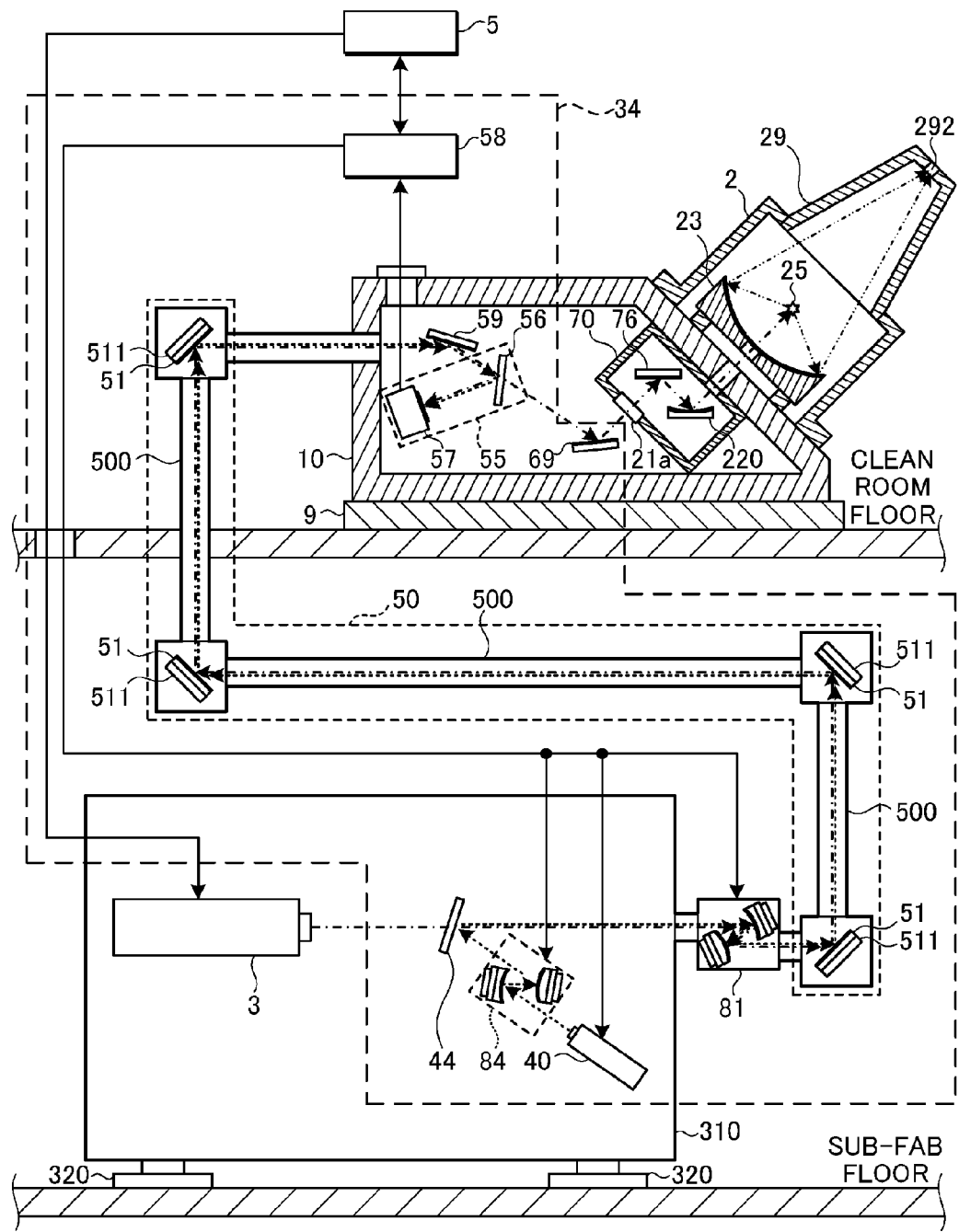
FIG. 2 is a partial sectional view illustrating an exemplary configuration of an EUV light generation system according to a first embodiment of the present disclosure.

FIG. 2 is a partial sectional view illustrating an exemplary configuration of an EUV light generation system according to a first embodiment of the present disclosure. In the first embodiment, the chamber 2 may be installed in a clean room floor, and the laser system 3 may be installed in a sub-fab floor. The sub-fab floor may be located downstairs from the clean room floor. The laser beam direction control unit 34 for controlling the travel direction of the laser beam outputted from the laser system 3 into the chamber 2 may be provided across the clean room floor and the sub-fab floor. The laser beam direction control unit 34 may correspond to the laser beam controlling device according to the present disclosure. The laser system 3 may be secured inside a housing 310 by a fixing device (not shown). The housing 310 may be installed on a floor in the sub-fab floor through a plurality of air suspensions 320.

In the housing 310 positioned in the sub-fab floor, the laser beam direction control unit 34 may include a guide laser device 40, a guide laser beam wavefront adjuster 84, and a beam combiner 44. The guide laser device 40 may be provided such that a guide laser beam outputted from the guide laser device 40 is incident on the guide laser beam wavefront adjuster 84.

The guide laser device 40 may be a laser device performing continuous oscillation (CW oscillation) or a laser device performing pulse oscillation at a predetermined repetition frequency. Average output light energy of the guide laser beam may be lower than average output light energy of the laser beam outputted from the laser system 3. Further, the guide laser beam may include different wavelength components from the laser beam outputted from the laser system 3.

The guide laser beam wavefront adjuster 84 may be provided in a beam path of the guide laser beam outputted from the guide laser device 40. The guide laser beam wavefront adjuster 84 may include a plurality of mirrors or a plurality of lenses. Alternatively, the guide laser beam wavefront adjuster 84 may include the combination of at least one mirror and at least one lens. An example of a concrete configuration of the guide laser beam wavefront adjuster 84 will be described later. When the guide laser beam wavefront adjuster 84 includes at least one mirror in the present disclosure, the guide laser beam outputted from the guide laser beam wavefront adjuster 84 may indicate a guide laser beam reflected by the guide laser beam wavefront adjuster 84. When the guide laser beam wavefront adjuster 84 includes a plurality of lenses, the guide laser beam outputted from the guide laser beam wavefront adjuster 84 may indicate a guide laser beam transmitted through the guide laser beam wavefront adjuster 84.

The beam combiner 44 may include a dichroic mirror. The laser beam outputted from the laser system 3 may be incident on a first surface of the beam combiner 44 (surface on the left side in FIG. 2). The guide laser beam outputted from guide laser beam wavefront adjuster 84 may be incident on a second surface of the beam combiner 44 (surface on the right side in FIG. 2). The beam combiner 44 may transmit the laser beam incident on the first surface with high transmittance and reflect the guide laser beam incident on the second surface with high reflectance. The beam combiner 44 may be provided at a predetermined arrangement angle with respect to the beam paths of the guide laser beam and the laser beam so that the travel direction of the laser beam and the travel direction of the guide laser beam substantially coincide with each other. In the present disclosure, the laser beam and the guide laser beam outputted from the beam combiner 44 may indicate a laser beam transmitted through the beam combiner 44 and a guide laser beam reflected by the beam combiner.

The beam combiner 44 may be configured to reflect the laser beam with high reflectance and transmit the guide laser beam with high transmittance. In that case, the laser beam and the guide laser beam outputted from the beam combiner 44 may indicate a laser beam reflected by the beam combiner 44 and a guide laser beam transmitted through the beam combiner.

In the sub-fab floor, the laser beam direction control unit 34 may include a both beam wavefront adjuster 81. The both beam wavefront adjuster 81 may be provided in a beam path of the laser beam and the guide laser beam outputted from the beam combiner 44. The both beam wavefront adjuster 81 may include a plurality of mirrors or a plurality of lenses. Alternatively, the both beam wavefront adjuster 81 may include the combination of at least one mirror and at least one lens. An example of a concrete configuration of the both beam wavefront adjuster 81 will be described later. In the present disclosure, the laser beam or the guide laser beam outputted from the both beam wavefront adjuster 81 may indicate a laser beam or a guide laser beam reflected by the both beam wavefront adjuster 81. Alternatively, the laser beam or the guide laser beam outputted from the both beam wavefront adjuster 81 may indicate a laser beam or a guide laser beam transmitted through the both beam wavefront adjuster 81.

In a region across the sub-fab floor and the clean room floor, the laser beam direction control unit 34 may include a beam delivery unit 50. The beam delivery unit 50 may include hollow optical path pipes 500. The optical path pipes 500 may be vacuum pipes, and dry air, an inert gas, etc. may be introduced into the optical path pipes 500. The beam delivery unit 50 may include a plurality of high-reflection mirrors 51. The plurality of high-reflection mirrors 51 may be provided so that the laser beam and the guide laser beam outputted from the both beam wavefront adjuster 81 are guided to the clean room floor. The plurality of high-reflection mirrors 51 may be supported by a plurality of respective mirror holders 511.

The chamber 2 may be secured on a chamber reference member 10 in the clean room floor. The chamber reference member 10 may be fixed on a floor in the clean room floor through an installation mechanism 9. The chamber reference member 10 may house a plurality of optical elements constituting a part of the laser beam direction control unit 34.

In the clean room floor, the laser beam direction control unit 34 may include an optical detector 55, a controller 58, and high-reflection mirrors 59 and 69. The optical detector 55 and the high-reflection mirrors 59 and 69 may be provided in the chamber reference member 10.

The high reflection mirror 59 may be positioned to reflect the laser beam and the guide laser beam transmitted to the clean room floor by the beam delivery unit 50 toward the optical detector 55.

The optical detector 55 may include a beam splitter 56 and a beam monitor 57. The beam splitter 56 may transmit the laser beam reflected by the high-reflection mirror 59 toward the high-reflection mirror 69 with high transmittance. Further, the beam splitter 56 may be configured to reflect a part of the laser beam and the guide laser beam reflected by the high-reflection mirror 59 toward the beam monitor 57 as sample beams. The beam monitor 57 may be configured to detect beam profiles for calculating parameters related to the wavefronts of the sample beams incident on the beam monitor 57 and output detection results to the controller 58.

The controller 58 may have functions of transmitting a control signal to the guide laser device 40 to output or stop the guide laser beam at desired timing. The controller 58 may calculate parameters related to the wavefronts of the sample beams based on the detection results outputted from the beam monitor 57. Thereafter, the controller 58 may perform feedback control of the guide laser beam wavefront adjuster 84 and the both beam wavefront adjuster 81 using the calculation result. A concrete example of the control will be given later with reference to FIGS. 3A to 6E.

The high-reflection mirror 69 may be positioned to reflect the laser beam having been transmitted through the beam splitter 56 toward a mirror housing 70. A window 21a may be provided in the mirror housing 70, and the laser beam reflected by the high-reflection mirror 69 may be transmitted through the window 21a with high transmittance. The laser beam transmitted through the window 21a may be reflected by a flat mirror 76 with high reflectance, reflected by a laser beam focusing mirror 220 with high reflectance, and focused on a target supplied to the plasma generation region 25.

3.2 Mechanism

Figure 3A:
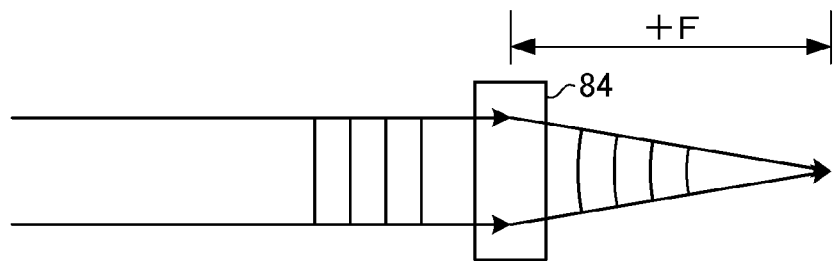
FIG. 3A is a diagram for discussing functions of a wavefront adjuster.
Figure 3B:
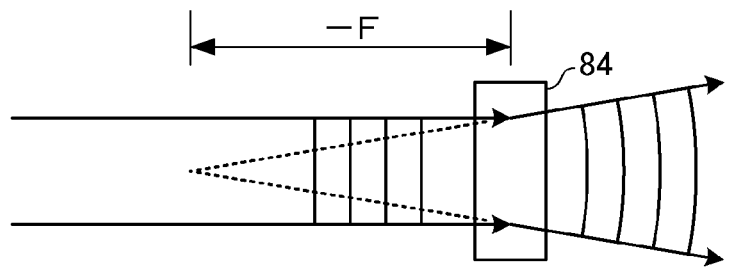
FIG. 3B is a diagram for discussing functions of the wavefront adjuster.

FIGS. 3A and 3B are diagrams for discussing functions of a wavefront adjuster. Here, the guide laser beam wavefront adjuster 84 adjusting the wavefront of the guide laser beam will be described. However, the same may be applied also to the both beam wavefront adjuster 81 adjusting the wavefront of the laser beam and the wavefront of the guide laser beam. In FIG. 3A, the guide laser beam wavefront adjuster 84 converts a guide laser beam having a planar wavefront (collimated wave) into a guide laser beam having a concave wavefront. In FIG. 3B, the guide laser beam wavefront adjuster 84 converts a guide laser beam having a planar wavefront (collimated wave) into a guide laser beam having a convex wavefront.

That is, the guide laser beam wavefront adjuster 84 may be an optical element that is capable of converting a wavefront of a guide laser beam as shown in FIG. 3A or as shown in FIG. 3B. Further, the guide laser beam wavefront adjuster 84 may be capable of converting a wavefront having a given curvature in a given range into a wavefront having another given curvature in the given range.

When the guide laser beam wavefront adjuster 84 has a focal length F, the optical power P of the guide laser beam wavefront adjuster 84 may be expressed in the following expression.

$$P = 1/F$$

When F is a positive value, a guide laser beam having a planar wavefront may be converted into a guide laser beam having a concave wavefront that is focused at a point distanced by the focal length F, in the forward direction, from the principal point of the guide laser beam wavefront adjuster 84 (see FIG. 3A).

When F is a negative value, a guide laser beam having a planar wavefront may be converted into a guide laser beam having a convex wavefront that is equivalent to a light generated from a virtual point light source at a position distanced by the focal length F, in the backward direction, from the principal point of the guide laser beam wavefront adjuster 84 (see FIG. 3B).

Figure 4A:
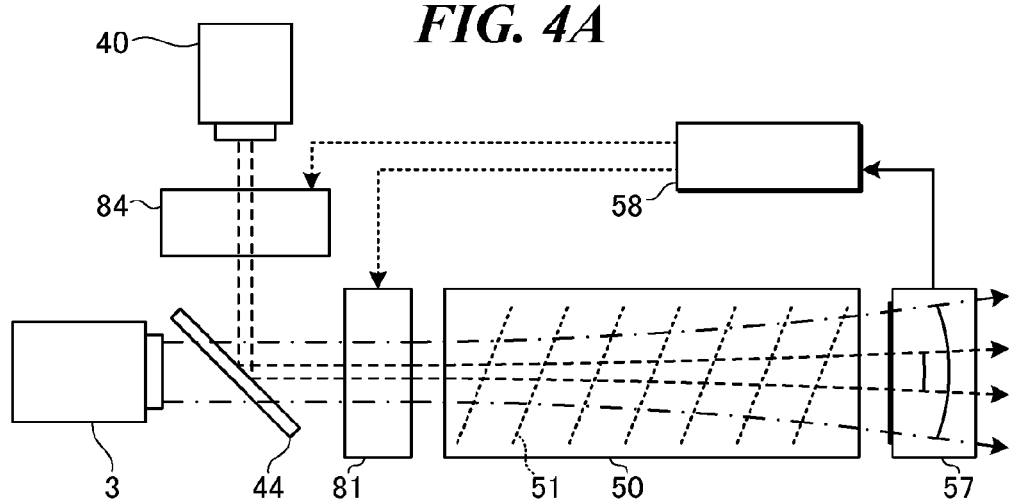
FIG. 4A is a diagram for discussing the mechanism of wavefront adjustment by a guide laser beam wavefront adjuster and a both beam wavefront adjuster.
Figure 4B:
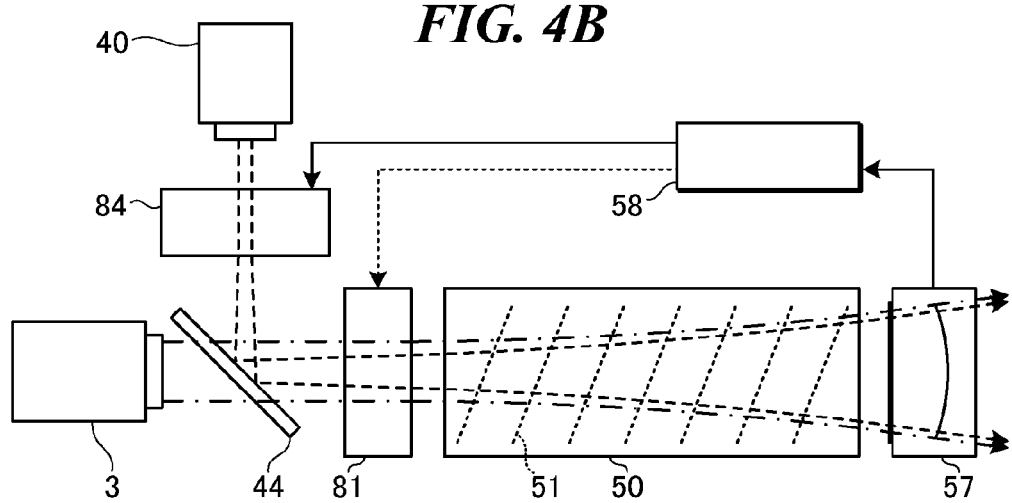
FIG. 4B is a diagram for discussing the mechanism of wavefront adjustment by the guide laser beam wavefront adjuster and the both beam wavefront adjuster.
Figure 4C:
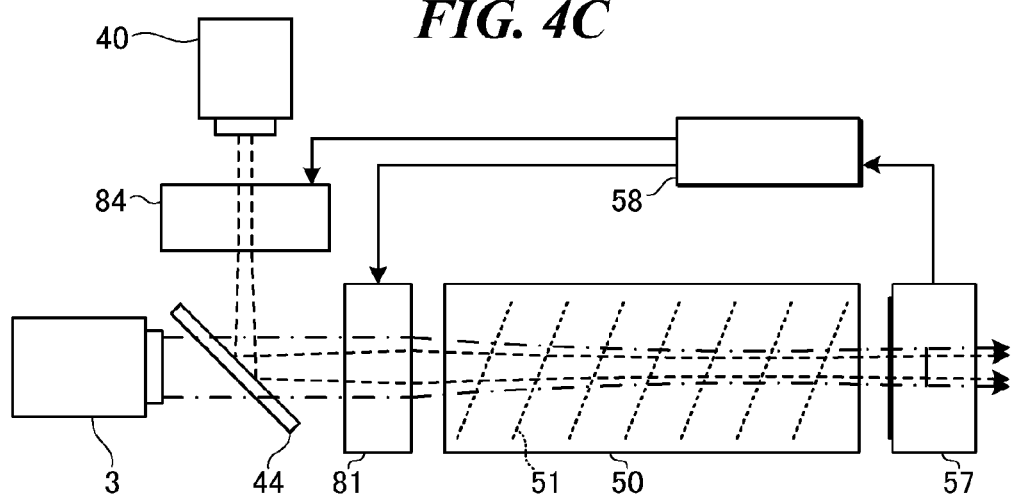
FIG. 4C is a diagram for discussing the mechanism of wavefront adjustment by the guide laser beam wavefront adjuster and the both beam wavefront adjuster.

FIGS. 4A through 4C are diagrams for discussing the mechanism of wavefront adjustment by the guide laser beam wavefront adjuster 84 and the both beam wavefront adjuster 81. The laser beam outputted from the laser system 3 may travel through the beam delivery unit 50 to enter the chamber 2. The length of the optical path from the input end to the output end of the beam delivery unit 50 may be as long as a few tens of meters, and the beam delivery unit 50 may include multiple high-reflection mirrors 51. A guide laser beam outputted from the guide laser device 40 may also travel through the beam delivery unit 50. The laser beam and the guide laser beam may enter the optical detector 55 provided between the beam delivery unit 50 and the chamber 2. Both a part of the laser beam and the guide laser beam may enter the beam monitor 57 included in the optical detector 55.

When the high-reflection mirrors 51 of the beam delivery unit 50 are heated by the energy of the laser beam and deform, distortion in the wavefront may accumulate along the beam path between the input end and the output end of the beam delivery unit 50. For example, when the high-reflection mirrors 51 are heated and deform, the laser beam and the guide laser beam may have a wavefront shown in FIG. 4A. When the wavefronts change in this way, the beam widths may also change as the laser beam and the guide laser beam travel. Here, the laser beam and the guide laser beam have different wavelengths, and thus the influence by diffraction of light may be different. For example, the wavefront of the guide laser beam changes slightly as illustrated by broken lines in FIG. 4A, while the wavefront of the laser beam having a wavelength component longer than a wavelength component included in the guide laser beam may change greatly as illustrated by dashed lines in FIG. 4A. In FIG. 4A, the wavefront of the laser beam and the wavefront of the guide laser beam are almost same on the upstream side of the beam delivery unit 50.

Then, as shown in FIG. 4B, the guide laser beam wavefront adjuster 84 may be controlled based on detection results of the wavefront of the laser beam and the wavefront of the guide laser beam. Accordingly, the wavefront of the guide laser beam may be adjusted such that the wavefront of the laser beam and the wavefront of the guide laser beam substantially coincide with each other at the beam monitor 57. Here, the wavefront of the laser beam and the wavefront of the guide laser beam may be different from each other on the upstream side of the beam delivery unit 50.

Further, the both beam wavefront adjuster 81 may be controlled based on detection results of the wavefront of the guide laser beam, as shown in FIG. 4C. Accordingly, the wavefront of the guide laser beam at the beam monitor 57 may be adjusted to be a desired value. Here, as described with reference to FIG. 4B, the guide laser beam wavefront adjuster 84 has been controlled to compensate a difference in influence of diffraction of light on a wavefront of the laser beam and on a wavefront of the guide laser beam. Therefore, at the beam monitor 57, the wavefront of the laser beam may substantially coincide with the wavefront of the guide laser beam.

In this way, the wavefront of the laser beam at the beam monitor 57 may be adjusted to a desired value. Accordingly, not only a distortion in the wavefront generated in the beam delivery unit 50 but also a distortion in the wavefront generated in a beam path upstream from the beam delivery unit 50 may be adjusted.

3.3 Operation
3.3.1 Main Flow

FIG. 5 is a flowchart showing an exemplary operation of the controller 58 in the first embodiment. The controller 58 may control the guide laser beam wavefront adjuster 84 and the both beam wavefront adjuster 81 using the guide laser beam such that the wavefront of the laser beam becomes a desired value, as described below.

First, the controller 58 may perform initial setting to control the guide laser beam wavefront adjuster 84 and the both beam wavefront adjuster 81 (S2100).

Next, the controller 58 may control the beam monitor 57, receive detection results from the beam monitor 57, and calculate a parameter Wd related to the wavefront of the laser beam (S2200).

Next, the controller 58 may control the beam monitor 57, receive detection results from the beam monitor 57, and calculate a parameter Wg related to the wavefront of the guide laser beam (S2300).

Subsequently, the controller 58 may calculate a difference $\Delta Wdg$ between the parameter Wd related to the wavefront of the laser beam and the parameter Wg related to the wavefront of the guide laser beam through the following expression (S2400).

$$\Delta Wdg = Wd - Wg$$

Then, the controller 58 may determine whether or not an absolute value of the difference $\Delta Wdg$ calculated in S2400 is equal to or smaller than a predetermined threshold $\Delta Wdgr$ (S2500). The predetermined threshold $\Delta Wdgr$ may be a positive value.

When the absolute value of the difference ΔWdg is not equal to or smaller than the predetermined threshold ΔWdgr (S2500; NO), the controller 58 may control the guide laser beam wavefront adjuster 84 so that the difference ΔWdg approaches 0 (S2600). Then, the controller 58 may return to the above-described S2300 and repeat the subsequent steps.

When the absolute value of the difference ΔWdg is equal to or smaller than the predetermined threshold ΔWdgr (S2500; YES), the controller 58 may proceed to S3200.

In S3200, the controller 58 may calculate a difference ΔWgt Between the Parameter Wg Related to the Wavefront of the guide laser beam and a predetermined value Wt through the following expression.

ΔWgt=Wg−Wt

The predetermined value Wt may be a value corresponding to the wavefront of the laser beam desirable to focus the laser beam on the plasma generation region 25.

Subsequently, the controller 58 may determine whether or not an absolute value of the difference Δwgt calculated in S3200 is equal to or smaller than a predetermined threshold ΔWgtr (S3300). The predetermined threshold ΔWgtr may be a positive value.

When the absolute value of the difference ΔWgt is not equal to or smaller than the predetermined threshold ΔWgtr (S3300; NO), the controller 58 may control the both beam wavefront adjuster 81 so that the difference ΔWgt approaches 0 (S3400). Next, the controller 58 may calculate the parameter wig related to the wavefront of the guide laser beam, similarly to S2300 (S3500). Then, the controller 58 may return to the above-described S3200 and repeat the subsequent steps.

When the absolute value of the difference ΔWgt is equal to or smaller than the predetermined threshold ΔWgtr (S3300; YES), the controller 58 may proceed to S3600.

In S3600, the controller 58 may output a signal indicating completion of the control of the wavefront (wavefront OK) to the EUV light generation controller 5. During the period from termination of the processing in S2100 to termination of the processing in S3600, the target 27 may not be outputted from the target generation unit 26. During the period from the termination of the processing in S2100 to the termination of the processing in S3600, a laser beam may not be outputted from the laser system 3 except for the case in which the parameter Wd related to the wavefront of the laser beam is calculated in S2200. After the process of S3600, the target 27 may be outputted from the target generation unit 26, and a laser beam may be outputted from the laser system 3, under the control of the EUV light generation controller 5.

Thereafter, the controller 58 may receive a signal from the EUV light generation controller 5 to determine whether or not the control of the wavefront using the guide laser beam is to be terminated (S3700). When a signal indicating termination of the control has been received from the EUV light generation controller 5 (S3700; YES), the controller 58 may terminate the control and finish the operation in this flowchart. When a signal indicating termination of the control has not been received (S3700; NO), the controller 58 may return to S3500 described above and repeat the subsequent steps. When the processing is returned from S3700 to S3500, the target 27 and the laser beam may be outputted while the subsequent processing from S3500 to S3700 is performed.

3.3.2 Initial Setting (Details of S2100)

Figure 6A:
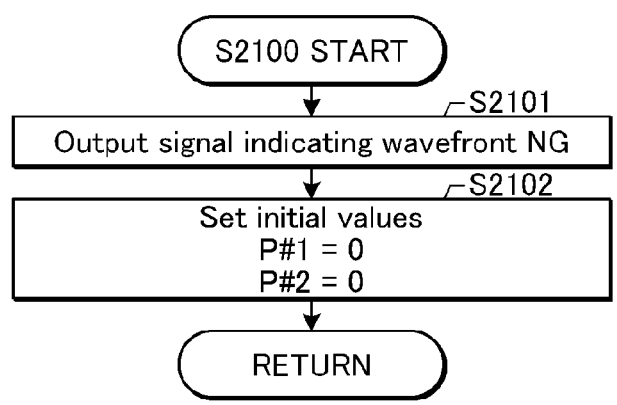
FIG. 6A is a flowchart showing the process for initial setting indicated in FIG. 5.

FIG. 6A is a flowchart showing the process for initial setting of FIG. 5. The process shown in FIG. 6A may be carried out by the controller 58 as a subroutine in S2100 of FIG. 5.

First, the controller 58 may output a signal indicating non-completion of the control of the wavefront (wavefront NG) to the EUV light generation controller 5 (S2101). In this way, the EUV light generation controller 5 may stop output of the target 27 from the target generation unit 26 and stop output of the laser beam from the laser system 3.

Subsequently, the controller 58 may set initial values (S2102). To be more specific, a current value P#1 of an optical power of the guide laser beam wavefront adjuster 84 and a current value P#2 of an optical power of the both beam wavefront adjuster 81 may be set to 0.

After S2102, the controller 58 may terminate operation in this flowchart.

3.3.3 Calculation of Wd (Details of S2200)

Figure 6B:
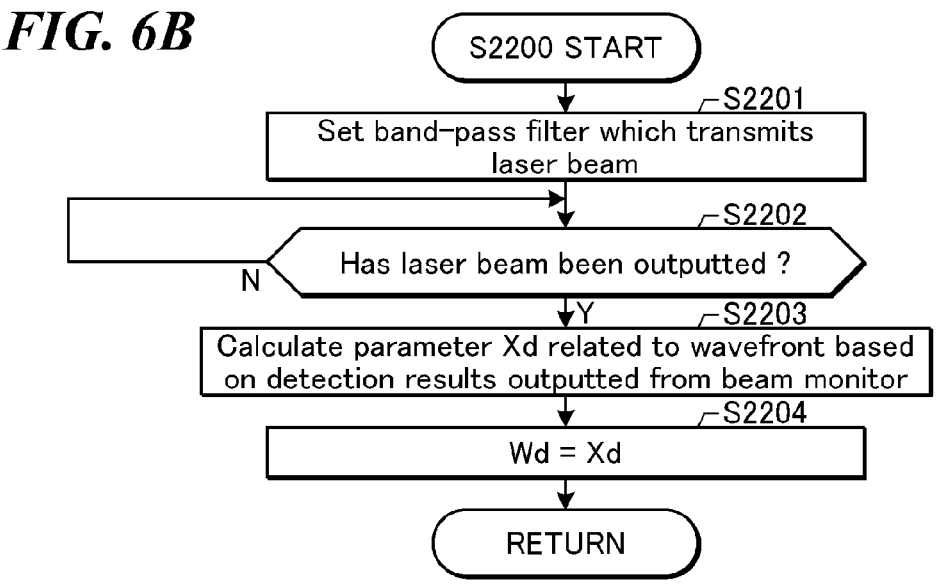
FIG. 6B is a flowchart showing the process for calculating a parameter related to a wavefront of the laser beam indicated in FIG. 5.

FIG. 6B is a flowchart showing the process for calculating a parameter Wd related to the wavefront of the laser beam indicated in FIG. 5. The process shown in FIG. 6B may be carried out by the controller 58 as a subroutine in S2200 of FIG. 5.

First, the controller 58 may control the beam monitor 57 and set a first band-pass filter included in the beam monitor 57 (S2201). The first band-pass filter may be an optical filter configured to transmit wavelength components included in the laser beam with high transmittance and attenuate or block wavelength components included in the guide laser beam. A concrete example of the beam monitor 57 and the first band-pass filter included therein will be described later.

Then, the controller 58 may receive a signal outputted from the EUV light generation controller 5 and determine whether or not a laser beam has been outputted from the laser system 3 (S2202). When a laser beam has not been outputted (S2202; NO), the controller 58 may stand by until a laser beam is outputted from the laser system 3. When a laser beam has been outputted (S2202; YES), the controller 58 may proceed to S2203.

In S2203, the controller 58 may calculate a parameter Xd related to the wavefront based on detection results outputted from the beam monitor 57.

Next, the controller 58 may store the calculated parameter Xd related to the wavefront in a memory 1002 (described later) as the parameter Wd related to the wavefront of the laser beam (S2204), and terminate the operation in this flowchart.

3.3.4 Calculation of Wg (Details of S2300)

Figure 6C:
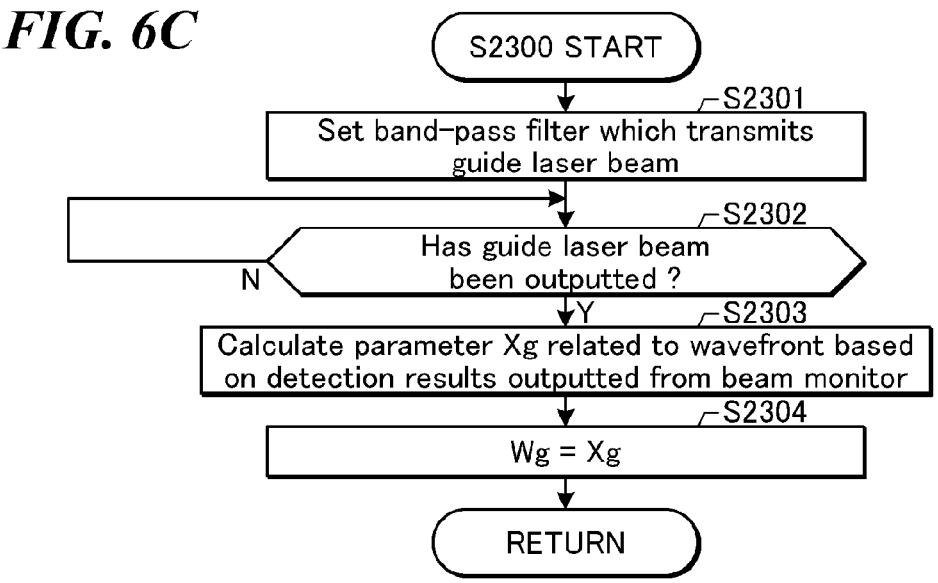
FIG. 6C is a flowchart showing the process for calculating a parameter related to a wavefront of the guide laser beam indicated in FIG. 5.

FIG. 6C is a flowchart showing the process for calculating the parameter Wg related to the wavefront of the guide laser beam indicated in FIG. 5. The process shown in FIG. 6C may be carried out by the controller 58 as a subroutine in S2300 or S3500 of FIG. 5.

First, the controller 58 may control the beam monitor 57 and set a second band-pass filter included in the beam monitor 57 (S2301). The second band-pass filter may be an optical filter configured to transmit wavelength components included in the guide laser beam with high transmittance and attenuate or block wavelength components included in the laser beam. A concrete example of the beam monitor 57 and the second band-pass filter included therein will be described later.

Then, the controller 58 may determine whether or not a guide laser beam has been outputted from the guide laser device 40 (S2302). When a guide laser beam has not been outputted (S2302; NO), the controller 58 may stand by until a guide laser beam is outputted from the guide laser device 40. When a guide laser beam has been outputted (S2302; YES), the controller 58 may proceed to S2303.

In S2303, the controller 58 may calculate a parameter Xg related to the wavefront based on detection results outputted from the beam monitor 57.

Next, the controller 58 may store the calculated parameter Xg related to the wavefront in the memory 1002 (described later) as the parameter Wg related to the wavefront of the guide laser beam (S2304), and terminate the operation in this flowchart.

3.3.5 Control of Guide Laser Beam Wavefront Adjuster (Details of S2600)

Figure 6D:
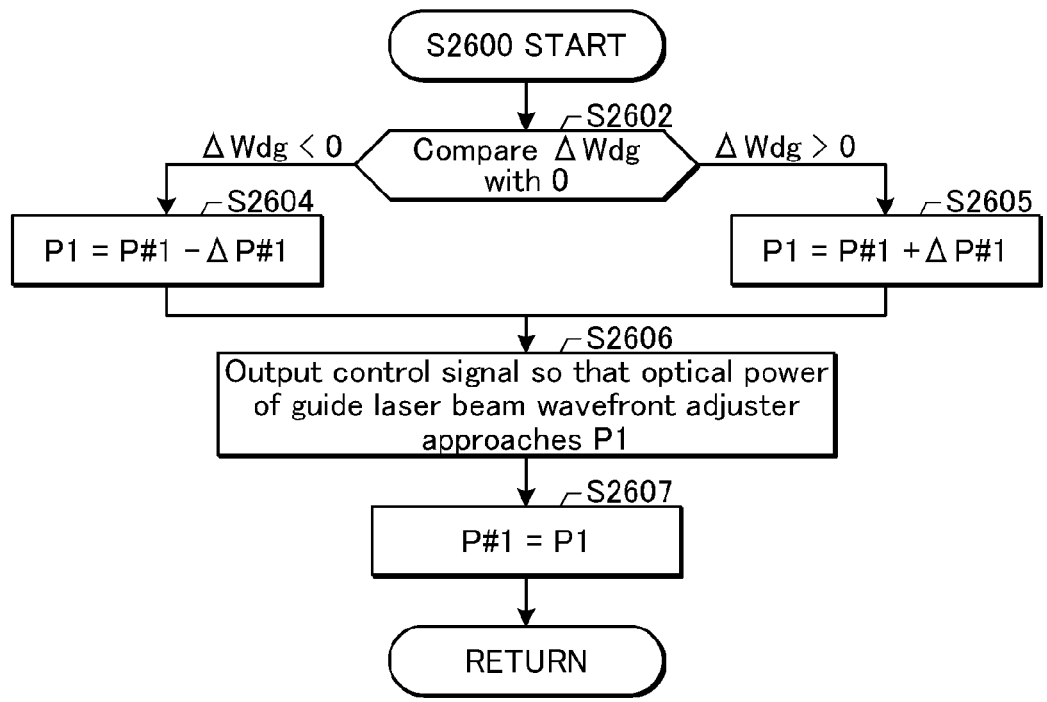
FIG. 6D is a flowchart showing the process for controlling the guide laser beam wavefront adjuster indicated in FIG. 5.

FIG. 6D is a flowchart showing the process for controlling the guide laser beam wavefront adjuster 84 indicated in FIG. 5. The process shown in FIG. 6D may be carried out by the controller 58 as a subroutine in S2600 of FIG. 5. The controller 58 may first compare the above-described difference ΔWdg with 0 (82602).

In 82602, when the difference ΔWdg is smaller than 0 (ΔWdg<0), the controller 58 may proceed to S2604. In S2604, a value obtained by subtracting a predetermined constant ΔP#1 from a current value P#1 of the optical power set in the guide laser beam wavefront adjuster 84 may be set as a target optical power P1.

In 82602, when the difference ΔWdg is greater than 0 (ΔWdg>0), the controller 58 may proceed to S2605. In S2605, a value obtained by adding the predetermined constant ΔP#1 to a current value P#1 of the optical power set in the guide laser beam wavefront adjuster 84 may be set as the target optical power P1. The predetermined constant ΔP#1 may be a positive value.

Subsequently, the controller 58 may output a control signal to the guide laser beam wavefront adjuster 84 so that the optical power of the guide laser beam wavefront adjuster 84 approaches the target optical power P1 (S2606).

Next, the controller 58 may store the above-described P1 in the memory 1002 (described later) as a current value P#1 of the optical power set in the guide laser beam wavefront adjuster 84 (S2607), and terminate the operation in this flowchart.

3.3.6 Control of Both Beam Wavefront Adjuster (Details of S3400)

Figure 6E:
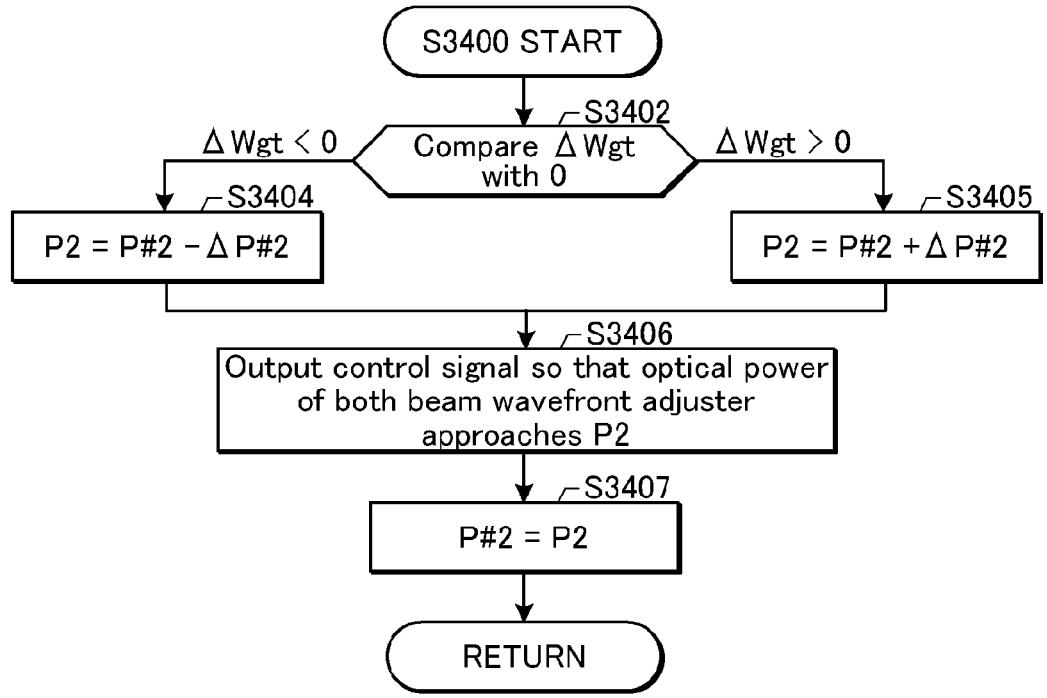
FIG. 6E is a flowchart showing the process for controlling the both beam wavefront adjuster indicated in FIG. 5.

FIG. 6E is a flowchart showing the process for controlling the both beam wavefront adjuster 81 indicated in FIG. 5. The process shown in FIG. 6E may be carried out by the controller 58 as a subroutine in S3400 of FIG. 5. The controller 58 may first compare the above-described difference ΔWgt with 0 (S3402).

In S3402, when the difference ΔWgt is smaller than 0 (ΔWgt<0), the controller 58 may proceed to S3404. In S3404, a value obtained by subtracting a predetermined constant ΔP#2 from a current value P#2 of the optical power set in the both beam wavefront adjuster 81 may be set as a target optical power P2.

In S3402, when the difference ΔWgt is greater than 0 (ΔWgt>0), the controller 58 may proceed to S3405. In S3405, a value obtained by adding the predetermined constant ΔP#2 to a current value P#2 of the optical power set in the both beam wavefront adjuster 81 may be set as the target optical power P2. The predetermined constant ΔP#2 may be a positive value.

Then, the controller 58 may output a control signal to the both beam wavefront adjuster 81 so that the optical power of the both beam wavefront adjuster 81 approaches the target optical power P2 (S3406).

Next, the controller 58 may store the above-described P2 in the memory 1002 (described later) as a current value P#2 of the optical power of the both beam wavefront adjuster 81 (S3407), and terminate the operation in this flowchart.

According to the first embodiment, even while the laser beam is not outputted from the laser system 3, the controller 58 may be capable of controlling the guide laser beam wavefront adjuster 84 and the both beam wavefront adjuster 81 based on the parameter related to the wavefront of the guide laser beam. Accordingly, even in the beginning of the output of the laser beam from the laser system 3, the wavefront of the laser beam may be controlled to a predefined range, and thus a focus position of the laser beam striking the target material in the chamber may be stabilized.

Figure 7A:
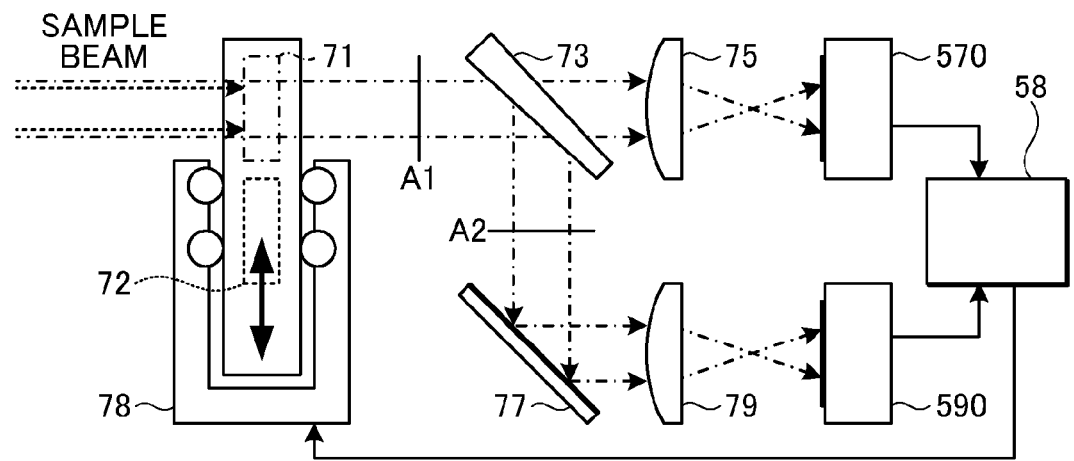
FIG. 7A schematically illustrates a first example of a beam monitor in the EUV light generation system according to the first embodiment.
Figure 7B:
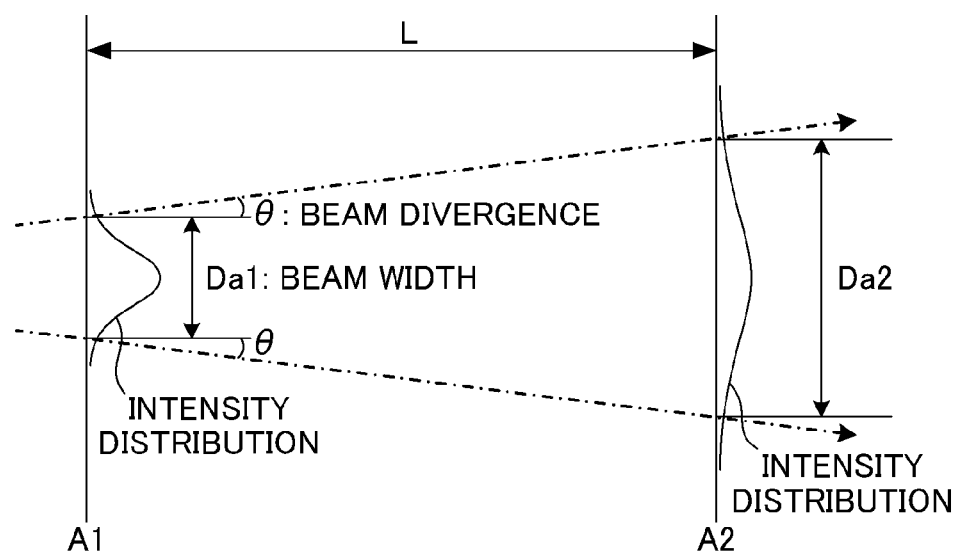
FIG. 7B is a diagram for discussing the mechanism of wavefront detection when the first example of the beam monitor is adopted.

3.4 Examples of Beam Monitor 3.4.1 Detecting Beam Width at Two Different Positions FIG. 7A schematically illustrates a first example of the beam monitor 57 in the EUV light generation system according to the first embodiment. FIG. 7B is a diagram for discussing the mechanism of wavefront detection when the first example of the beam monitor is adopted. In the first example, the beam monitor 57 may detect beam profiles at two distinct positions along the travel direction of a sample beam. Here, the sample beam may be a part of the laser beam and the guide laser beam both reflected by the beam splitter 56 to be incident on the beam monitor 57. The beam profiles may be a beam intensity distribution in a beam cross section of the laser beam or the guide laser beam, for example.

As shown in FIG. 7A, the beam monitor 57 may include the first band-pass filter 71, the second band-pass filter 72, the beam splitter 73, a high-reflection mirror 77, transfer optical systems 75 and 79, and beam profilers 570 and 590. Each of the beam profilers 570 and 590 may, for example, be a line sensor or a charge coupled device (CCD) camera.

The first band-pass filter 71 and the second band-pass filter 72 may be configured to be movable through an actuator 78. The actuator 78 may be controlled by the controller 58. The first band-pass filter 71 may be an optical filter configured to transmit the laser beam with high transmittance and attenuate or block rays at other wavelengths. The second band-pass filter 72 may be an optical filter configured to transmit the guide laser beam with high transmittance and attenuate or block rays at other wavelengths.

The beam splitter 73 may be configured and positioned to transmit a part of the sample beam toward the transfer optical system 75 and reflect the remaining part of the sample beam toward the high-reflection mirror 77. The high-reflection mirror 77 may be positioned to reflect the beam reflected by the beam splitter 73 toward the transfer optical system 79 with high reflectance.

The transfer optical system 75 may transfer a beam profile at a given position A1 on a beam path of the sample beam onto the photosensitive surface of the beam profiler 570. The transfer optical system 79 may transfer a beam profile at another given position A2 on the beam path of the sample beam onto the photosensitive surface of the beam profiler 590. An optical path length of the sample beam between the position A1 and the photosensitive surface of the beam profiler 570 may be equal to an optical path length of the sample beam between the position A2 and the photosensitive surface of the beam profiler 590. The beam profilers 570 and 590 may output data of the beam profiles transferred onto the photosensitive surfaces to the controller 58.

The controller 58 may calculate a beam width Da1 of the sample beam at the position A1 from the data outputted from the beam profiler 570. The term "beam width" may refer to a width of a region having beam intensity equal to or greater than $1/e^2$ of the peak intensity in a beam intensity distribution.

Further, the controller 58 may calculate a wavefront curvature of the sample beam as a parameter related to the wavefront based on the data outputted from the beam profilers 570 and 590. For example, the controller 58 may calculate a beam width Da2 of the sample beam at the position A2 based on the output from the beam profiler 590. Then, the controller

58 may calculate a wavefront curvature of the sample beam based on a difference between the beam width Da1 and the beam width Da2 of the sample beam. In order to calculate a wavefront curvature of the sample beam, a beam divergence θ may be calculated through the following expression.

$$\theta = \tan^{-1}\{(Da2-Da1)/2L\}$$

Here, L may be a distance between the position A1 and the position A2 along the beam path of the sample beam.

As shown in FIG. 7A, when the actuator 78 moves the first band-pass filter 71 onto a beam path of the sample beam, wavelength components of the laser beam included in the sample beam may reach the beam splitter 73. Accordingly, the beam width and the parameters related to the wavefront of the laser beam may be calculated by the controller 58.

When the actuator 78 moves the second band-pass filter 72 onto the beam path of the sample beam, wavelength components of the guide laser beam included in the sample beam may reach the beam splitter 73. Accordingly, the beam width and the parameters related to the wavefront of the guide laser beam may be calculated by the controller 58.

Here, the transfer optical systems 75 and 79 may preferably have a function of compensating for chromatic aberration for the wavelengths of the laser beam and the guide laser beam. For example, each of the transfer optical systems 75 and 79 may be an achromatic lens or a combination of achromatic lenses. Further, the transfer optical system 75 and 79 may preferably be configured such that chromatic aberration is small in principle.

According to the first example, the beam profiler 570 may be shared to detect the laser beam and the guide laser beam, or the beam profiler 590 may be shared to detect the laser beam and the guide laser beam. Accordingly, a difference between the wavefront of the laser beam and the wavefront of the guide laser beam may be detected with high precision.

Based on the above-described calculation results, the controller 58 may control the guide laser beam wavefront adjuster 84 and the both beam wavefront adjuster 81. The controller 58 may carry out the same operation as shown in the flowcharts of FIGS. 5 to 6E.

3.4.2 Detecting Beam Width and Spot Width

Figure 8:
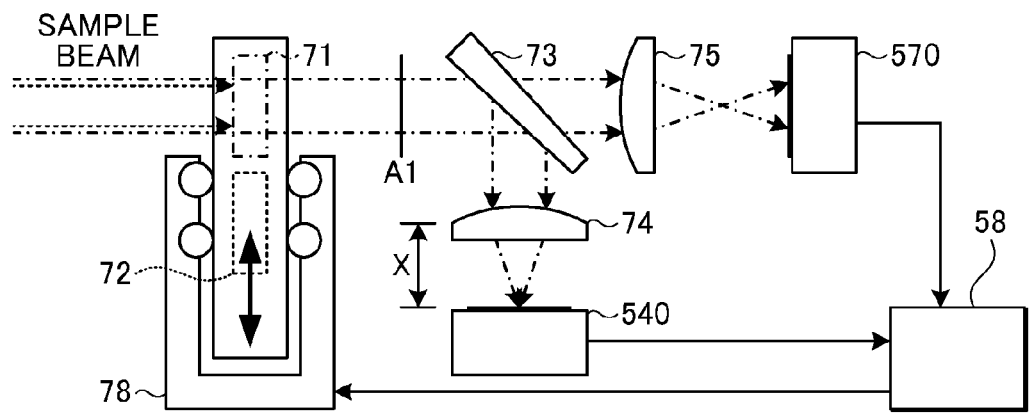
FIG. 8 schematically illustrates a second example of a beam monitor in the EUV light generation system according to the first embodiment.

FIG. 8 schematically illustrates a second example of the beam monitor 57 in the EUV light generation system according to the first embodiment. In the second example, the beam monitor 57 may split a sample beam by the beam splitter 73 so as to detect a beam profile of the sample beam and a focused beam spot width of the sample beam.

As shown in FIG. 8, the beam monitor 57 may include the first band-pass filter 71, the second band-pass filter 72, the beam splitter 73, a focusing optical system 74, the transfer optical system 75, and beam profilers 540 and 570.

The first band-pass filter 71 and the second band-pass filter 72 may be configured to be movable through the actuator 78. The actuator 78 may be controlled by the controller 58. The first band-pass filter 71 may be an optical filter configured to transmit the laser beam with high transmittance and attenuate or block rays at other wavelengths. The second band-pass filter 72 may be an optical filter configured to transmit the guide laser beam with high transmittance and attenuate or block rays at other wavelengths.

The beam splitter 73 may be configured and positioned to transmit a part of the sample beam toward the transfer optical system 75 and reflect the remaining part thereof toward the focusing optical system 74.

The transfer optical system 75 may be positioned to transfer a beam profile at a given position A1 on a beam path of the sample beam onto a photosensitive surface of the beam profiler 570. The focusing optical system 74 may be positioned to focus a part of the sample beam split from the beam splitter 73 onto a photosensitive surface of the beam profiler 540. The beam profiler 540 may be positioned so that the above-described photosensitive surface is distanced by a predetermined distance X from the principal point of the focusing optical system 74.

The predetermined distance X may be equal to a distance to a point where a laser beam having a required wavefront is focused by the focusing optical system 74. The required wavefront may be a wavefront set such that predetermined focusing performance can be achieved in the plasma generation region 25 when the laser beam is focused by the laser beam focusing mirror 220. When the required wavefront is a planar wavefront, the predetermined distance X may be equal to a focal length of the focusing optical system 74. When the required wavefront is convex, the predetermined distance X may be longer than the focal length of the focusing optical system 74. When the required wavefront is concave, the predetermined distance X may be shorter than the focal length of the focusing optical system 74. The beam profiler 570 may output data of the beam intensity distribution on a beam cross section transferred onto the photosensitive surface to the controller 58. The beam profiler 540 may output data of the beam intensity distribution at a focusing spot on the photosensitive surface to the controller 58.

The controller 58 may calculate a beam width Da1 of the sample beam at the position A1 based on the data from the beam profiler 570. Further, the controller 58 may calculate a spot width Sd of the focused sample beam based on the data from the beam profiler 540. Then, the controller 58 may calculate a wavefront curvature of the sample beam. In order to calculate the wavefront curvature of the sample beam, a beam divergence θ may be calculated through the following expression.

$$\theta = Sd/X$$

When the actuator 78 moves the first band-pass filter 71 onto a beam path of the sample beam, wavelength components of the laser beam included in the sample beam may reach the beam splitter 73. Accordingly, the beam width and the parameters related to the wavefront of the laser beam may be calculated by the controller 58.

When the actuator 78 moves the second band-pass filter 72 onto the beam path of the sample beam, wavelength components of the guide laser beam included in the sample beam may reach the beam splitter 73. Accordingly, the beam width and the parameters related to the wavefront of the guide laser beam may be calculated by the controller 58.

Here, the focusing optical system 74 and the transfer optical system 75 may preferably have a function of compensating for chromatic aberration for the wavelengths of the laser beam and the guide laser beam. For example, each of the focusing optical system 74 and the transfer optical system 75 may be an achromatic lens or a combination of achromatic lenses. Further, the focusing optical system 74 and the transfer optical system 75 may preferably be configured such that chromatic aberration is small in principle.

According to the second example, the beam profiler 540 may be shared to detect the laser beam and the guide laser beam, or the beam profiler 570 may be shared to detect the laser beam and the guide laser beam. Accordingly, a difference between the wavefront of the laser beam and the wavefront of the guide laser beam may be detected with high precision.

Based on the above-described calculation results, the controller 58 may control the guide laser beam wavefront adjuster 84 and the both beam wavefront adjuster 81. The controller 58 may carry out the same operation as shown in the flowcharts of FIGS. 5 to 6E.

3.4.3 Shack-Hartmann Wavefront Sensor

Figure 9:
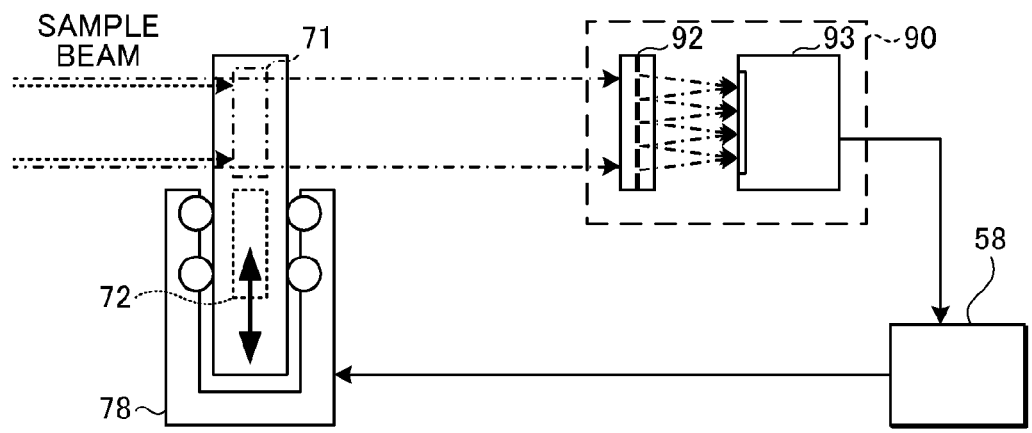
FIG. 9 schematically illustrates a third example of a beam monitor in the EUV light generation system according to the first embodiment.

FIG. 9 schematically illustrates a third example of the beam monitor 57 in the EUV light generation system according to the first embodiment. In the third example, a Shack-Hartmann wavefront sensor 90 may be used to obtain a wavefront curvature as a parameter related to the wavefront of a sample beam.

As shown in FIG. 9, the beam monitor 57 may include the first band-pass filter 71, the second band-pass filter 72, and the Shack-Hartmann wavefront sensor 90. The Shack-Hartmann wavefront sensor 90 may include a screen 92 and a CCD camera 93. Instead of the screen 92, a micro lens array (not shown) may be used.

The first band-pass filter 71 and the second band-pass filter 72 may be configured to be movable through the actuator 78. The actuator 78 may be controlled by the controller 58. The first band-pass filter 71 may be an optical filter configured to transmit the laser beam with high transmittance and attenuate or block rays at other wavelengths. The second band-pass filter 72 may be an optical filter configured to transmit the guide laser beam with high transmittance and attenuate or block rays at other wavelengths.

The screen 92 may be an optical element in which a number of pinholes are arranged two-dimensionally. The CCD camera 93 may be an element for capturing an interference pattern generated by the screen 92.

The controller 58 may calculate a wavefront curvature as a parameter related to the wavefront of the sample beam from an output of the CCD camera 93. The shape of the interference pattern (intervals of peaks in the beam intensity in the interference pattern, for example) generated by the screen 92 may depend on a wavelength and a wavefront curvature of a sample beam. Accordingly, when the wavelength of the sample beam is known, the wavefront curvature of the sample beam may be calculated from the shape of the interference pattern.

When the actuator 78 moves the first band-pass filter 71 onto a beam path of the sample beam, wavelength components of the laser beam included in the sample beam may reach the Shack-Hartmann wavefront sensor 90. Accordingly, the wavefront curvature of the laser beam may be calculated by the controller 58.

When the actuator 78 moves the second band-pass filter 72 onto the beam path of the sample beam, wavelength components of the guide laser beam included in the sample beam may reach the Shack-Hartmann wavefront sensor 90. Accordingly, the wavefront curvature of the guide laser beam may be calculated by the controller 58.

According to the third example, the Shack-Hartmann wavefront sensor 90 may be shared to detect the laser beam and the guide laser beam, and thus a difference between the wavefront of the laser beam and the wavefront of the guide laser beam may be detected with high precision.

Based on the above-described calculation results, the controller 58 may control the guide laser beam wavefront adjuster 84 and the both beam wavefront adjuster 81. The controller 58 may carry out the same operation as shown in the flowcharts of FIGS. 5 to 6E.

3.4.4 Combination of Shack-Hartmann Wavefront Sensor and Beam Profiler

Figure 10:
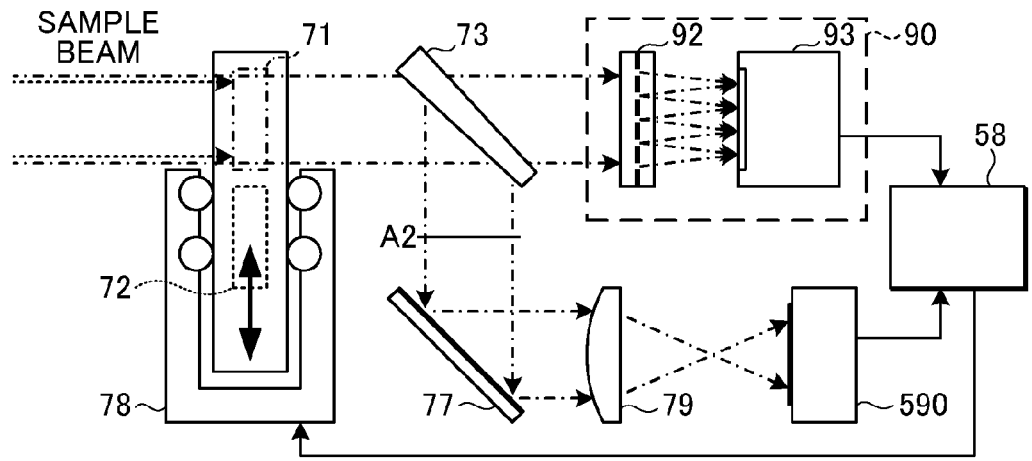
FIG. 10 schematically illustrates a fourth example of a beam monitor in the EUV light generation system according to the first embodiment.

FIG. 10 schematically illustrates a fourth example of the beam monitor 57 in the EUV light generation system according to the first embodiment. In the fourth example, the Shack-Hartmann wavefront sensor 90 is used. In addition, in order to obtain a beam width of a sample beam, the beam monitor 57 may include the beam splitter 73, the high-reflection mirror 77, the transfer optical system 79, and the beam profiler 590.

The controller 58 may calculate a beam width of the sample beam at the position A2 based on the data outputted from the beam profiler 590.

The other aspects may be similar to those of the third example.

3.5 Examples of Wavefront Adjuster

3.5.1 Combination of Concave Lens and Convex Lens

Figure 11A:
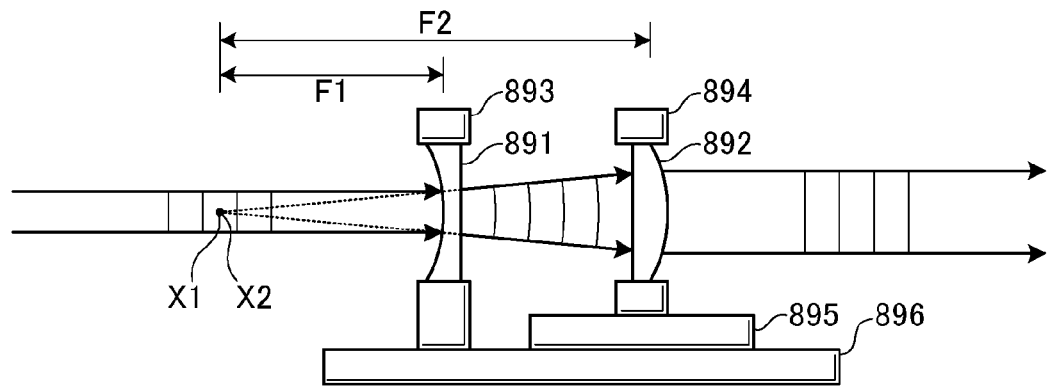
FIG. 11A schematically illustrates a first example of a wavefront adjuster in the EUV light generation system according to the first embodiment.
Figure 11B:
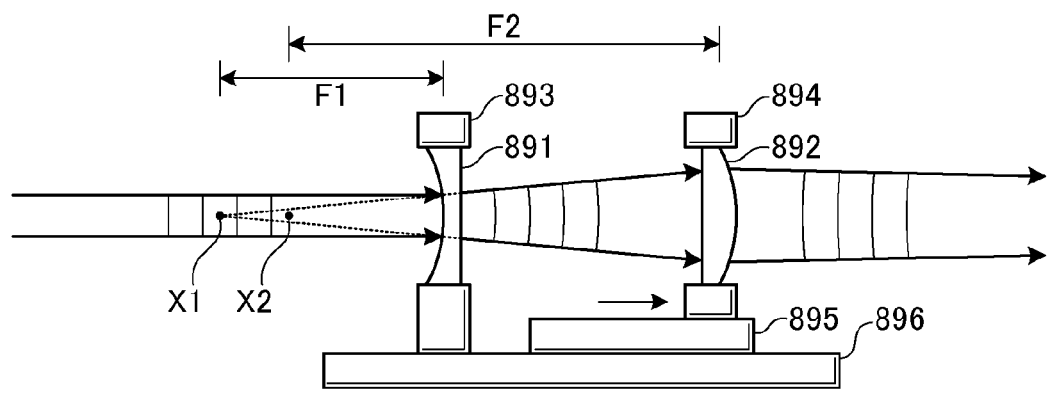
FIG. 11B schematically illustrates the first example of the wavefront adjuster in the EUV light generation system according to the first embodiment.
Figure 11C:
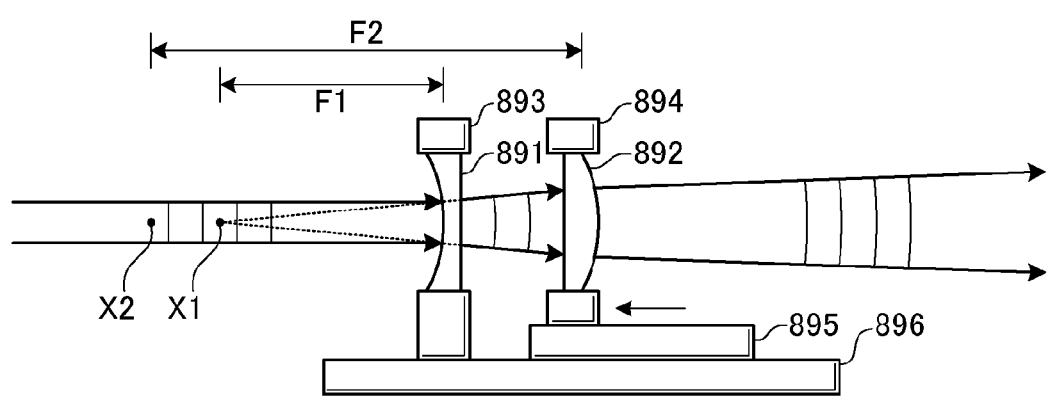
FIG. 11C schematically illustrates the first example of the wavefront adjuster in the EUV light generation system according to the first embodiment.

FIGS. 11A through 11C schematically illustrate a first example of a wavefront adjuster in the EUV light generation system according to the first embodiment. The first example of the wavefront adjuster may be used as the guide laser beam wavefront adjuster 84, for example. In the first example, the wavefront adjuster may include a concave lens 891 and a convex lens 892.

The concave lens 891 may be fixed by a mirror holder 893 at a position on which the guide laser beam outputted from the guide laser device 40 (see FIG. 2) is incident. The mirror holder 893 may be fixed to a fixing plate 896. The concave lens 891 may transmit the guide laser beam.

The convex lens 892 may be held by a mirror holder 894 at a position on which the guide laser beam transmitted through the concave lens 891 is incident. The mirror holder 894 may be held by the fixing plate 896 through a linear stage 895. The linear stage 895 may support the mirror holder 894 such that the convex lens 892 held by the mirror holder 894 can reciprocate relative to the fixing plate 896 along a beam path axis of the guide laser beam. The convex lens 892 may transmit the guide laser beam toward the beam combiner 44 (see FIG. 2).

The concave lens 891 may have a front focusing point X1 at a position separated from the principal point of the concave lens 891 by a focal length F1 toward the upstream side of the guide laser beam. The convex lens 892 may have a front focusing point X2 at a position separated from the principal point of the convex lens 892 by a focal length F2 toward the upstream side of the guide laser beam. As shown in FIG. 11A, when the front focusing point X1 of the concave lens 891 and the front focusing point X2 of the convex lens 892 coincide with each other, the optical power of the wavefront adjuster may be substantially 0.

As shown in FIG. 11B, the linear stage 895 may move the convex lens 892 to the downstream side of the guide laser beam, which may move the front focusing point X2 of the convex lens 892 toward the more downstream side of the guide laser beam than the front focusing point X1 of the concave lens 891. Here, the optical power of the wavefront adjuster may have a positive value.

As shown in FIG. 11C, the linear stage 895 may move the convex lens 892 to the upstream side of the guide laser beam, which may move the front focusing point X2 of the convex lens 892 toward the more upstream side of the guide laser beam than the front focusing point X1 of the concave lens 891. Here, the optical power of the wavefront adjuster may have a negative value.

Thus, the wavefront adjuster may adjust the wavefront of the guide laser beam.

In the first example, the wavefront adjuster includes the combination of the concave lens 891 and the convex lens 892. However, the wavefront adjuster may include the combination of a concave mirror and a convex mirror, similarly to the guide laser beam wavefront adjuster 84 and the both beam wavefront adjuster 81 exemplified in FIG. 2.

3.5.2 Using VRM

Figure 12A:
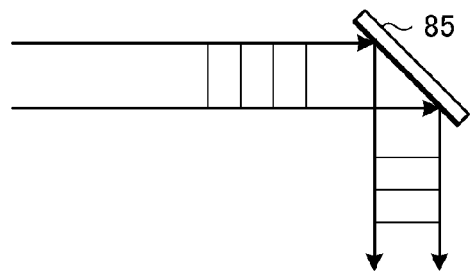
FIG. 12A schematically illustrates a second example of the wavefront adjuster in the EUV light generation system according to the first embodiment.
Figure 12B:
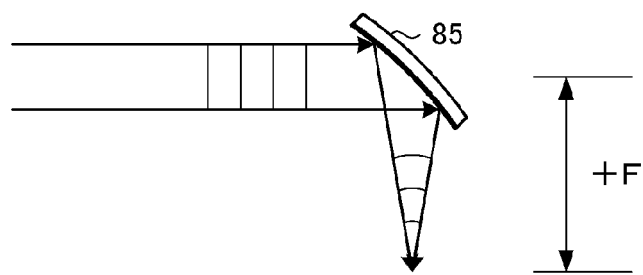
FIG. 12B schematically illustrates the second example of the wavefront adjuster in the EUV light generation system according to the first embodiment.
Figure 12C:
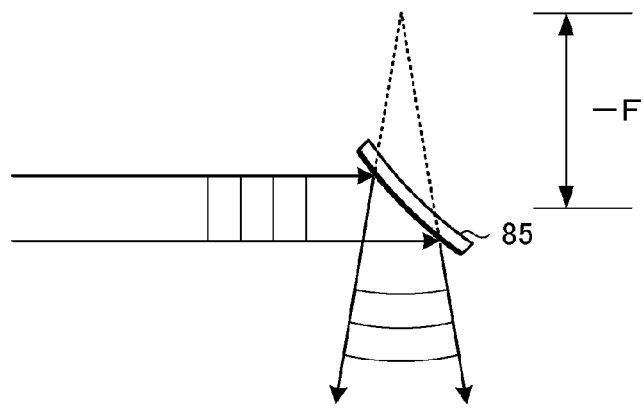
FIG. 12C schematically illustrates the second example of the wavefront adjuster in the EUV light generation system according to the first embodiment.

FIGS. 12A through 12C schematically illustrate a second example of the wavefront adjuster in the EUV light generation system according to the first embodiment. The second example of the wavefront adjuster may be used as the guide laser beam wavefront adjuster 84 or the both beam wavefront adjuster 81. In the second example, the wavefront adjuster may include a variable radius mirror (VRM) 85.

When the VRM 85 is used as the both beam wavefront adjuster 81, the VRM 85 may be supported by a mirror holder (not shown) in a beam path of the laser beam and the guide laser beam both outputted from the beam combiner 44 (see FIG. 2).

The VRM 85 may be a mirror of which the curvature of the reflective surface can be modified. The VRM 85 may be transformed to be a flat mirror as shown in FIG. 12A. Here, the value of the optical power of the VRM 85 may be substantially 0. The VRM 85 may also be transformed to be a concave mirror with a focal length +F as shown in FIG. 12B. Here, the optical power of the VRM 85 may have a positive value. The VRM 85 may also be transformed to be a convex mirror with a focal length −F as shown in FIG. 12C. Here, the optical power of the VRM 85 may have a negative value. Thus, the VRM 85 may adjust the wavefront of a laser beam.

Figure 12D:
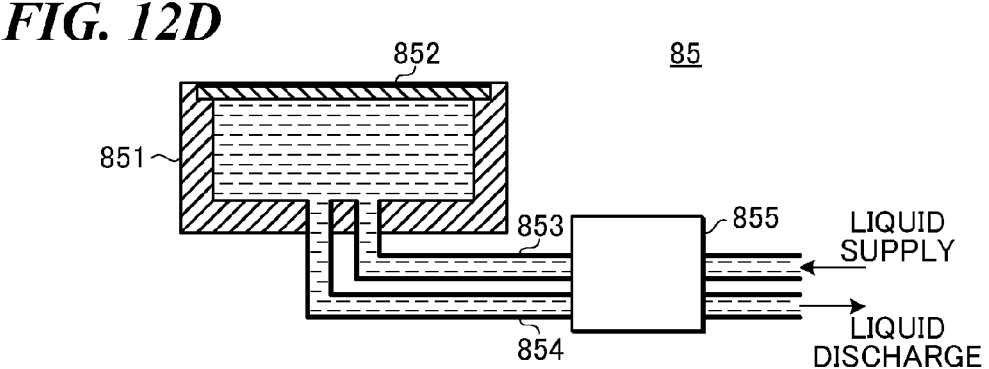
FIG. 12D is a partial sectional view showing a configuration of a VRM in the second example of the wavefront adjuster.

FIG. 12D is a partial sectional view showing a configuration of the VRM in the second example of the wavefront adjuster. The VRM 85 may include a pressure cavity 851, a reflector 852, a supply pipe 853, a discharge pipe 854, and a pressure adjuster 855.

The pressure cavity 851 may be a rigid container in which a liquid such as water is stored. The reflector 852 may be an elastic plate fitted into an opening of the pressure cavity 851. A reflective layer reflecting the laser beam and the guide laser beam with high reflectance may be formed on one surface of the reflector 852, and this surface of the reflective layer may be exposed to the exterior of the pressure cavity 851.

One end of each of the supply pipe 853 and the discharge pipe 854 may be connected to the pressure cavity 851. The other end of each of the supply pipe 853 and the discharge pipe 854 may be connected to the pressure adjuster 855.

The pressure adjuster 855 may supply a liquid into the pressure cavity 851 through the supply pipe 853 and increase a pressure inside the pressure cavity 851 based on a control signal outputted from the controller 58. The pressure adjuster 855 may discharge a liquid from the pressure cavity 851 through the discharge pipe 854 and decrease a pressure inside the pressure cavity 851 based on a control signal outputted from the controller 58.

By increasing and decreasing a pressure inside the pressure cavity 851, the curvature of the reflective layer of the reflector 852 may be adjusted. Thus, the wavefronts of the laser beam and the guide laser beam reflected by the reflective layer of the reflector 852 may be adjusted.

3.5.3 Using Deformable Mirror

Figure 13A:
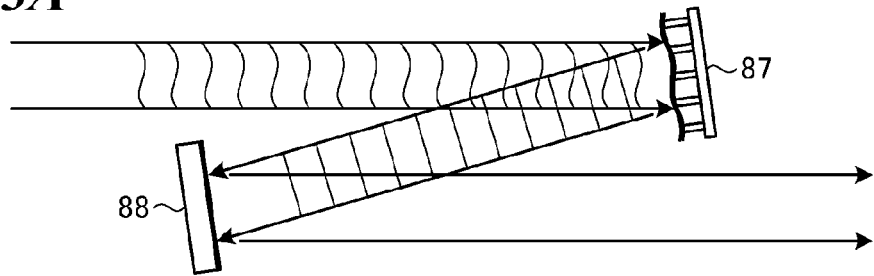
FIG. 13A schematically illustrates a third example of the wavefront adjuster in the EUV light generation system according to the first embodiment.

FIG. 13A schematically illustrates a third example of the wavefront adjuster in the EUV light generation system according to the first embodiment. The third example of the wavefront adjuster may be used as the guide laser beam wavefront adjuster 84 or the both beam wavefront adjuster 81. In the third example, the wavefront adjuster may include a deformable mirror 87.

When the deformable mirror 87 is used as the both beam wavefront adjuster 81, the position of the deformable mirror 87 may be fixed by a mirror holder (not shown) in a beam path of the laser beam and the guide laser beam outputted from the beam combiner 44 (see FIG. 2). The deformable mirror 87 may be capable of compensating a wavefront of the laser beam and the guide laser beam with high precision by controlling the shape of its reflective surface even if these beams have wavefronts different from aspherical surfaces.

The wavefront adjuster may further include a flat mirror 88. The deformable mirror 87 may reflect the laser beam and the guide laser beam toward the flat mirror 88. The flat mirror 88 may be fixed by a mirror holder (not shown) in a beam path of the laser beam and the guide laser beam reflected by the deformable mirror 87. The flat mirror 88 may reflect the laser beam and the guide laser beam toward the beam delivery unit 50 (see FIG. 2).

Figure 13B:
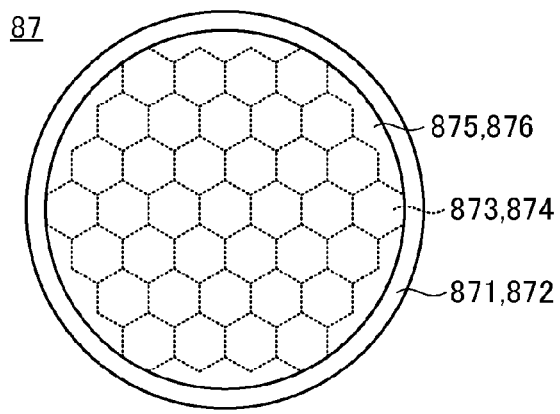
FIG. 13B is a plan view showing a configuration of a deformable mirror in the third example of the wavefront adjuster.
Figure 13C:
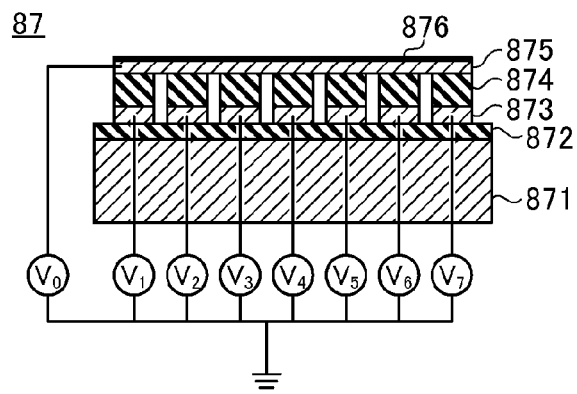
FIG. 13C is a partial sectional view of the deformable mirror shown in FIG. 13B.

FIG. 13B is a plan view showing a configuration of the deformable mirror in the third example of the wavefront adjuster. FIG. 13C is a partial sectional view of the deformable mirror shown in FIG. 13B. The deformable mirror 87 may include a substrate 871, an insulating layer 872, a plurality of lower electrodes 873, a plurality of piezoelectric members 874, an upper electrode 875, and a reflective layer 876.

The substrate 871 may be a substrate serving as a base of the deformable mirror 87. The insulating layer 872 may be formed on the upper surface of the substrate 871. The plurality of lower electrodes 873 may be formed on the upper surface of the insulating layer 872 to be spaced apart from one another. The plurality of piezoelectric members 874 may be formed on the upper surfaces of the respective lower electrodes 873. The upper electrode 875 may be formed across the upper surfaces of the plurality of piezoelectric members 874 to serve as a common electrode. The reflective layer 876 may be formed on the upper surface of the upper electrode 875, and configured to reflect the laser beam and the guide laser beam with high reflectance.

With the above-described configuration, a common potential $V_0$ may be applied to the upper electrode 875 and potentials $V_1$ through $V_7$ may be applied to the respective lower electrodes 873 through a potential control circuit (not shown). Accordingly, each of the piezoelectric members 874 may deform independently, and the surface shape of the reflective layer 876 may be varied.

Figure 14:
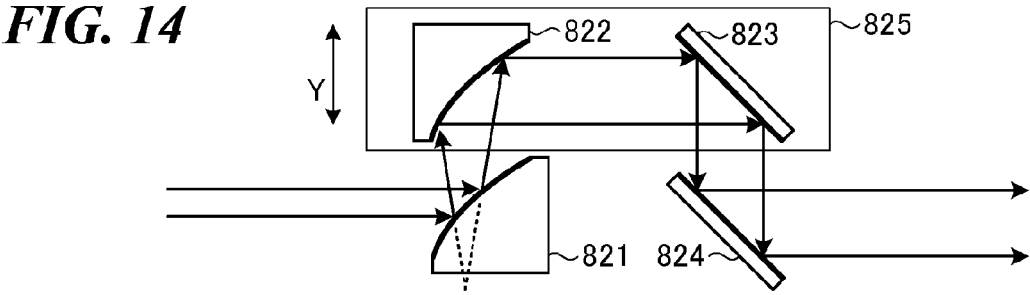
FIG. 14 schematically illustrates a fourth example of the wavefront adjuster in the EUV light generation system according to the first embodiment.

3.5.4 Combination of Off-Axis Paraboloidal Convex Mirror and Off-Axis Paraboloidal Concave Mirror FIG. 14 schematically illustrates a fourth example of the wavefront adjuster in the EUV light generation system according to the first embodiment. The fourth example of the wavefront adjuster may be used as the guide laser beam wavefront adjuster 84 or the both beam wavefront adjuster 81. In the fourth example, the wavefront adjuster may include an off-axis paraboloidal convex mirror 821, an off-axis paraboloidal concave mirror 822, flat mirrors 823 and 824, a mirror fixing plate 825, and a driving mechanism (not shown).

When the fourth example of the wavefront adjuster is used as the both beam wavefront adjuster 81, the off-axis paraboloidal convex mirror 821 may be fixed by a mirror holder (not shown) in a beam path of the laser beam and the guide laser beam outputted from the beam combiner 44 (see FIG. 2). The off-axis paraboloidal convex mirror 821 may reflect the laser beam and the guide laser beam toward the off-axis paraboloidal concave mirror 822.

The off-axis paraboloidal concave mirror 822 may be fixed to the mirror fixing plate 825 through a mirror holder (not shown). The off-axis paraboloidal concave mirror 822 may reflect the laser beam and the guide laser beam reflected by the off-axis paraboloidal convex mirror 821 toward the flat mirror 823.

The flat mirror 823 may be fixed to the mirror fixing plate 825 through another mirror holder (not shown). The flat mirror 823 may reflect the laser beam and the guide laser beam reflected by the off-axis paraboloidal concave mirror 822 toward the flat mirror 824.

The flat mirror 824 may be fixed by a mirror holder (not shown) in a beam path of the laser beam and the guide laser beam reflected by the flat mirror 823. The flat mirror 824 may reflect the laser beam and the guide laser beam toward the beam delivery unit 50 (see FIG. 2).

The mirror fixing plate 825 may be movable in the direction of the arrow Y through the driving mechanism. The wavefront of the laser beam and the guide laser beam may be adjusted by increasing or decreasing the distance from the mirror fixing plate 825 to the off-axis paraboloidal convex mirror 821 and the flat mirror 824. To output a beam having a planer wavefront from the off-axis paraboloidal concave mirror 822, the wavefront adjuster may be adjusted such that the reflected light from the off-axis paraboloidal convex mirror 821 is regarded as light having the same wavefront as virtual light emitted from a focusing point of the off-axis paraboloidal concave mirror 822. When the laser beam and the guide laser beam outputted from the beam combiner 44 are beams having a planer wavefront, the focusing point of the off-axis paraboloidal convex mirror 821 and the focusing point of the off-axis paraboloidal concave mirror 822 may be same with each other.

4. EUV Light Generation System where Wavefront of Laser Beam is Adjusted to Wavefront of Guide Laser Beam (Second Embodiment)

Figure 15:
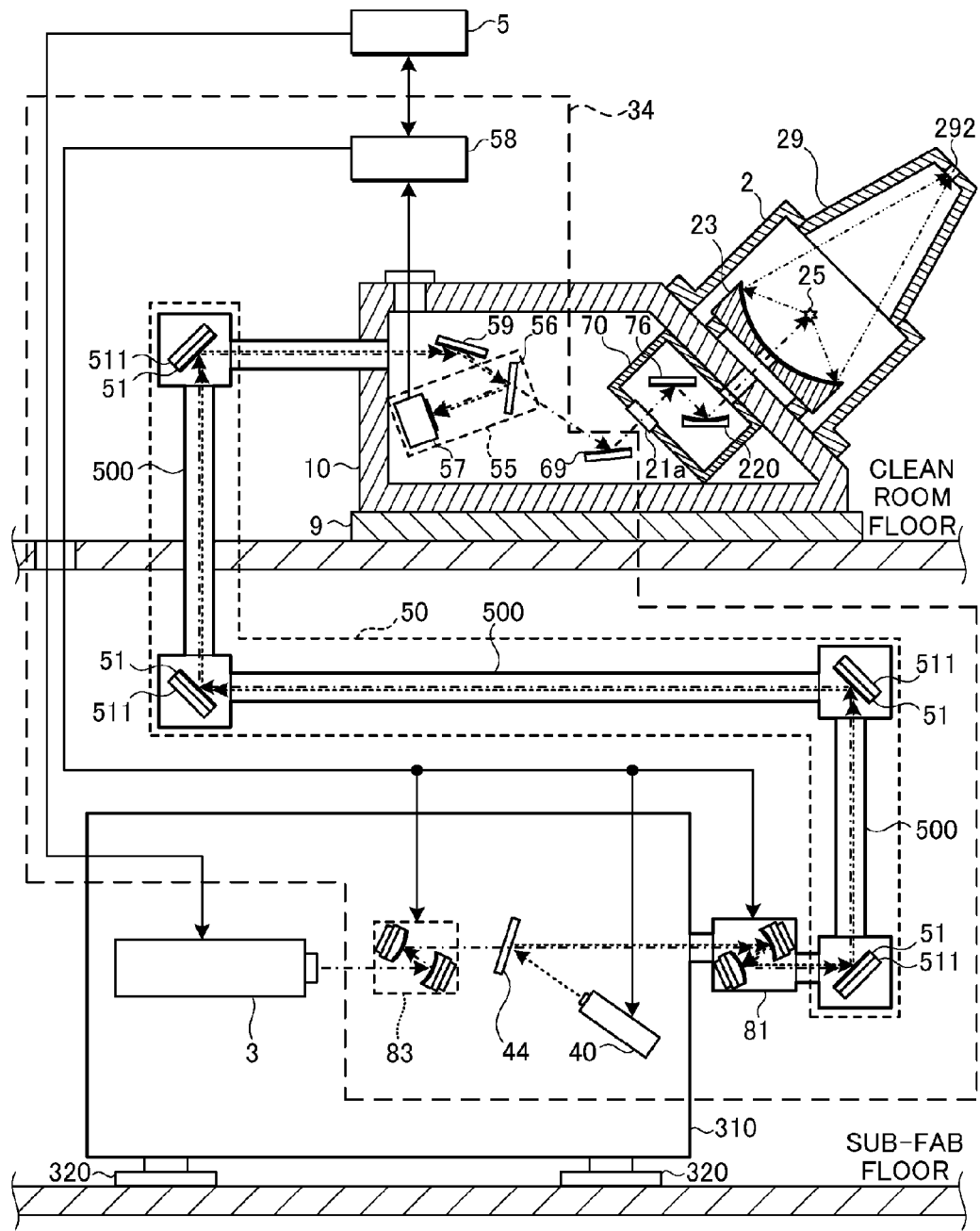
FIG. 15 is a partial sectional view illustrating an exemplary configuration of an EUV light generation system according to a second embodiment of the present disclosure.

FIG. 15 is a partial sectional view illustrating an exemplary configuration of an EUV light generation system according to a second embodiment of the present disclosure. The EUV light generation system according to the second embodiment may include a laser beam wavefront adjuster 83 in a beam path between the laser system 3 and the beam combiner 44 in the sub-fab floor. The configuration of the laser beam wavefront adjuster 83 may be similar to the configuration of the both beam wavefront adjuster 81. The EUV light generation system according to the second embodiment may not include the guide laser beam wavefront adjuster 84 (see FIG. 2).

In the second embodiment, the controller 58 may control the laser beam wavefront adjuster 83 to reduce a difference between the wavefront of the laser beam and the wavefront of the guide laser beam, if the difference exists. After adjusting the wavefront of the laser beam and the wavefront of the guide laser beam to substantially coincide with each other, the controller 58 may adjust the wavefront of the laser beam by controlling the both beam wavefront adjuster 81. The controller 58 may control the both beam wavefront adjuster 81 based on detection results of the wavefront of the guide laser beam, similarly to the first embodiment. In the present disclosure, the laser beam outputted from the laser beam wavefront adjuster 83 may indicate a laser beam reflected by the laser beam wavefront adjuster 83. Alternatively, the laser beam outputted from the laser beam wavefront adjuster 83 may indicate a laser beam transmitted through the laser beam wavefront adjuster 83.

The other aspects may be similar to those of the first embodiment.

5. EUV Light Generation System where Wavefront of Laser Beam and Wavefront of Guide Laser Beam are Adjusted (Third Embodiment)

Figure 16:
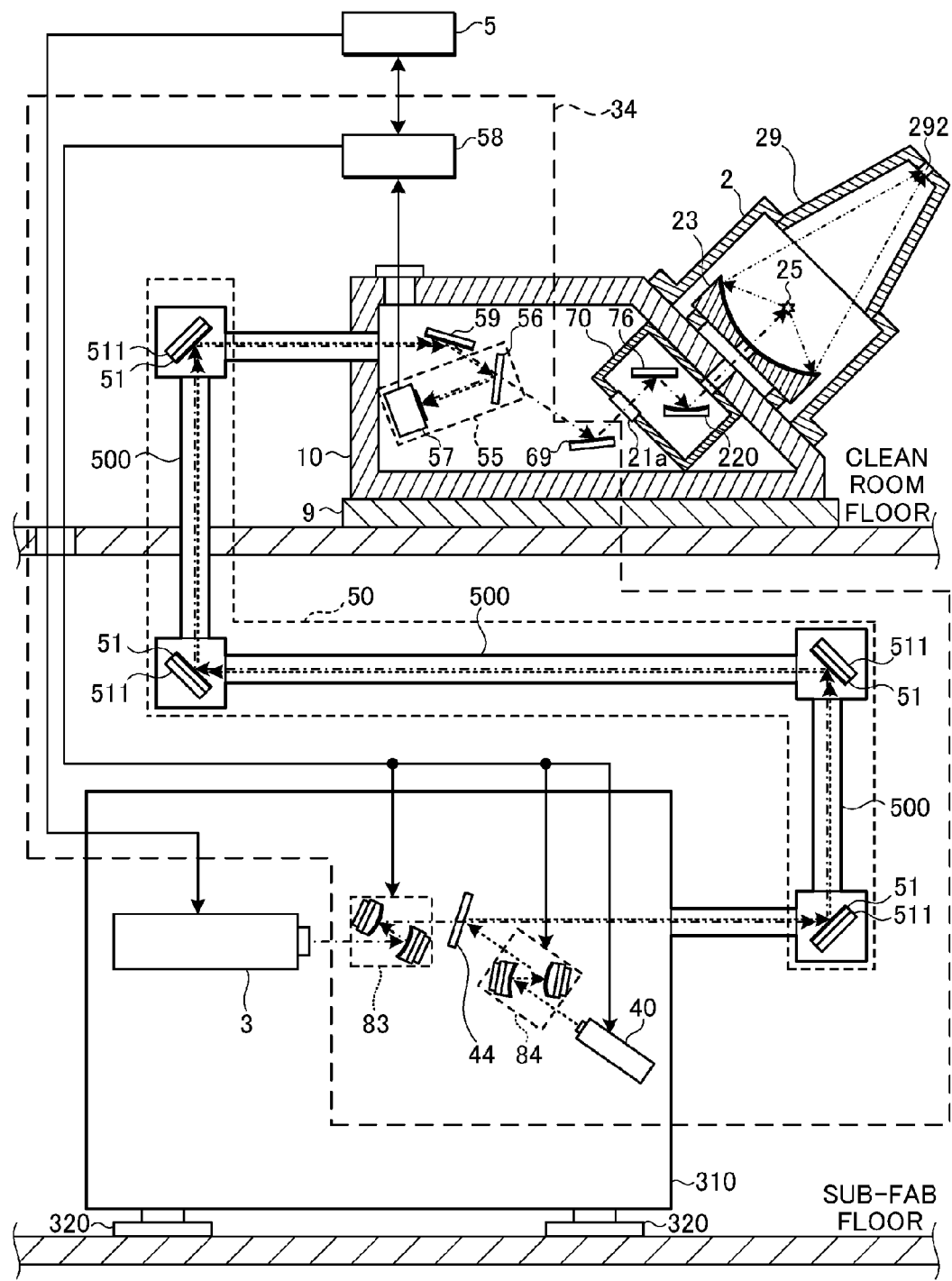
FIG. 16 is a partial sectional view illustrating an exemplary configuration of an EUV light generation system according to a third embodiment of the present disclosure.

FIG. 16 is a partial sectional view illustrating an exemplary configuration of an EUV light generation system according to a third embodiment of the present disclosure. The EUV light generation system according to the third embodiment may include the guide laser beam wavefront adjuster 84 in a beam path between the guide laser device 40 and the beam combiner 44 in the sub-fab floor. The EUV light generation system according to the third embodiment may not include the both beam wavefront adjuster 81 (see FIG. 15).

In the third embodiment, the controller 58 may control the guide laser beam wavefront adjuster 84 or the laser beam wavefront adjuster 83 to reduce a difference between the wavefront of the laser beam and the wavefront of the guide laser beam, if the difference exists. After adjusting the wavefront of the laser beam and the wavefront of the guide laser beam to substantially coincide with each other, the controller 58 may control both the guide laser beam wavefront adjuster 84 and the laser beam wavefront adjuster 83 with a same control amount based on detection results of the wavefront of the guide laser beam. The control with a same control amount indicates control of both the guide laser beam wavefront adjuster 84 and the laser beam wavefront adjuster 83 so that change amounts of the optical powers thereof are substantially equal to each other.

The other aspects may be similar to those of the second embodiment.

6. EUV Light Generation System where Wavefront and Beam Width are Adjusted (Fourth Embodiment)

6.1 Configuration

Figure 17:
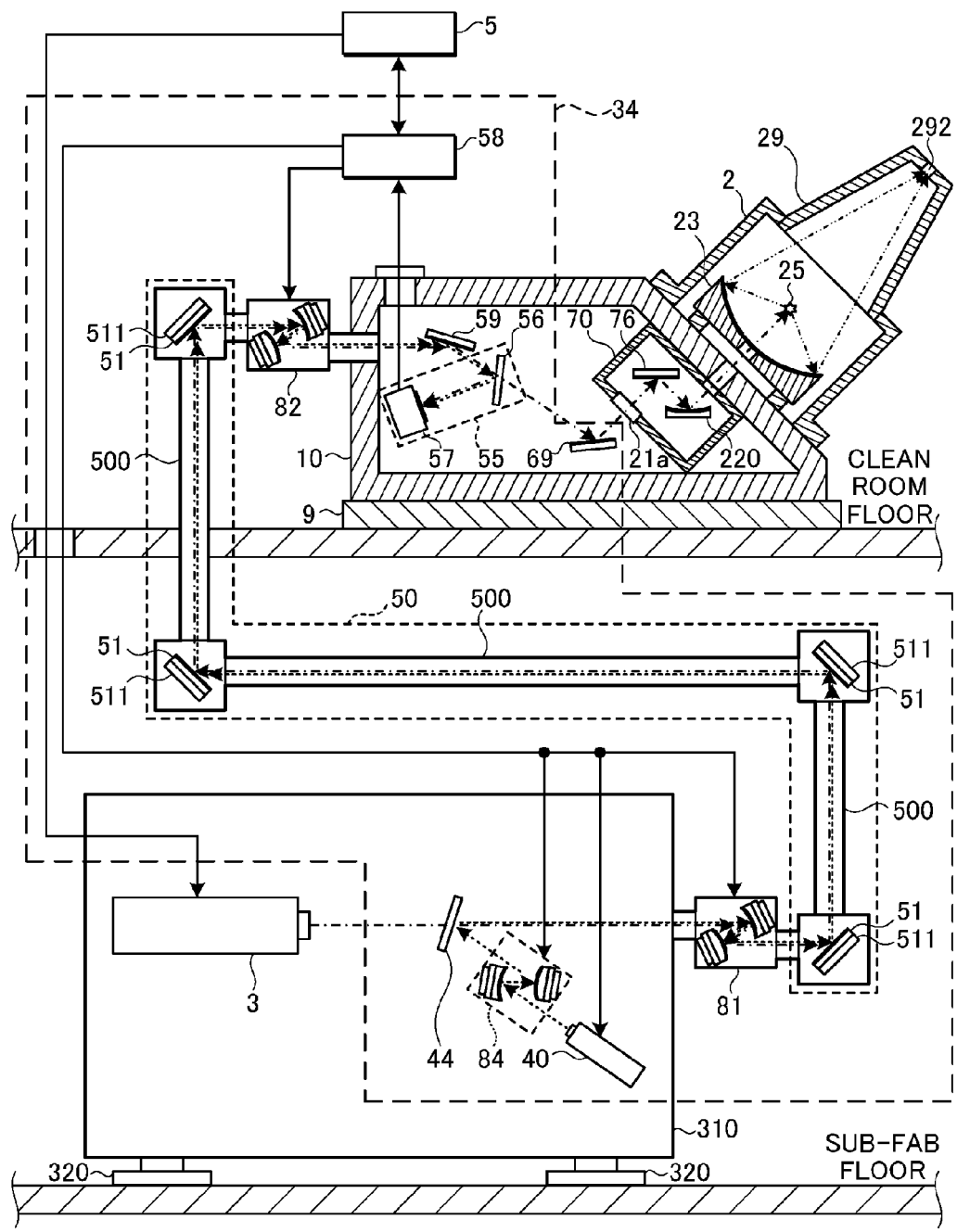
FIG. 17 is a partial sectional view illustrating an exemplary configuration of an EUV light generation system according to a fourth embodiment of the present disclosure.

FIG. 17 is a partial sectional view illustrating an exemplary configuration of an EUV light generation system according to a fourth embodiment of the present disclosure. The EUV light generation system of the fourth embodiment may include a second both beam wavefront adjuster 82 in a beam path between the beam delivery unit 50 and the optical detector 55 in the clean room floor, in addition to the configuration of the first embodiment. The configuration of the second both beam wavefront adjuster 82 may be similar to the configuration of the both beam wavefront adjuster 81. The other configurations may be similar to those of the first embodiment.

Alternatively, the second both beam wavefront adjuster 82 may be added to the configuration of the second embodiment or the third embodiment (not shown).

Figure 18A:
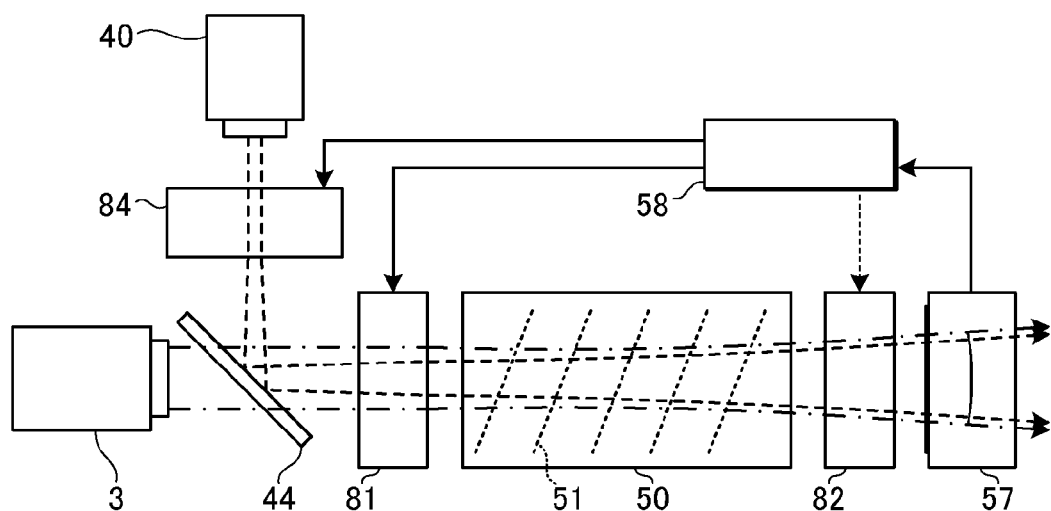
FIG. 18A is a diagram for discussing the mechanism of adjustment of a wavefront and a beam width by a guide laser beam wavefront adjuster, a both beam wavefront adjuster, and a second both beam wavefront adjuster.
Figure 18B:
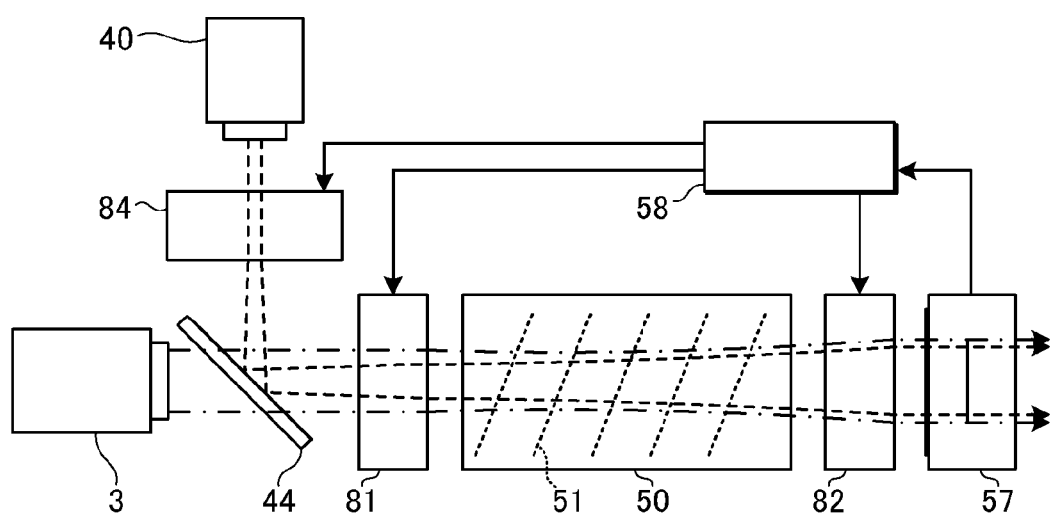
FIG. 18B is a diagram for discussing the mechanism of adjustment of the wavefront and the beam width by the guide laser beam wavefront adjuster, the both beam wavefront adjuster, and the second both beam wavefront adjuster.

FIGS. 18A and 18B are diagrams for discussing the mechanism of adjustment of a wavefront and a beam width by the guide laser beam wavefront adjuster 84, the both beam wavefront adjuster 81, and the second both beam wavefront adjuster 82. As shown in the above-described FIG. 4C, even when a wavefront of the guide laser beam is adjusted to coincide with a wavefront of the laser beam by the guide laser beam wavefront adjuster 84 and wavefronts of these beams are adjusted by the both beam wavefront adjuster 81, a desired beam width may not be obtained.

Then, as shown in FIG. 18A, the both beam wavefront adjuster 81 may be controlled so that the beam width of the guide laser beam at the beam monitor 57 becomes a predetermined value. That is, the both beam wavefront adjuster 81 may be controlled based not on detection results of the wavefront at the beam monitor 57 but on detection results of the beam width at the beam monitor 57.

Further, as shown in FIG. 18B, the second both beam wavefront adjuster 82 may be controlled so that the parameter related to the wavefront of the guide laser beam at the beam monitor 57 becomes a predetermined value. That is, the second both beam wavefront adjuster 82 may be controlled based on detection results of the wavefront at the beam monitor 57.

In this way, the beam width and the wavefront at the beam monitor 57 may be adjusted to desired values. Here, a second beam monitor (not shown) may be provided, in a beam path between the beam delivery unit 50 and the second both beam wavefront adjuster 82, for detecting beam widths of the laser beam and the guide laser beam on the downstream side of the beam delivery unit 50. That is, the parameter related to the wavefront may be calculated based on detection results of the beam monitor 57, and the beam width may be calculated based on detection results of the second beam monitor.

6.2 Operation
6.2.1 Main Flow

Figure 19:
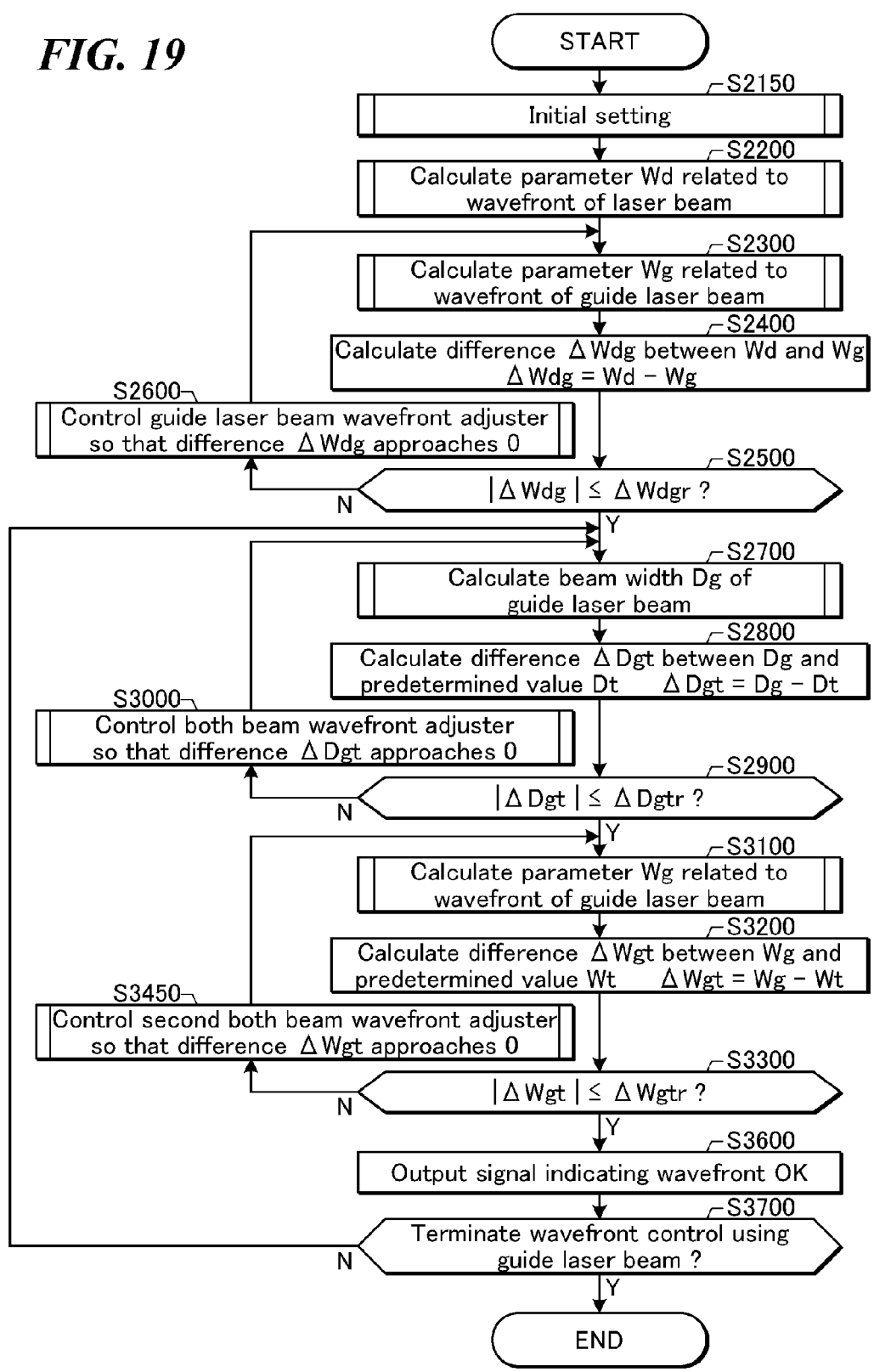
FIG. 19 is a flowchart showing an exemplary operation of a controller in the fourth embodiment.

FIG. 19 is a flowchart showing an exemplary operation of the controller 58 in the fourth embodiment. The controller 58 may control the guide laser beam wavefront adjuster 84, the both beam wavefront adjuster 81, and the second both beam wavefront adjuster 82 using the guide laser beam such that the wavefront and the beam width of the laser beam become desired values, as described below.

First, the controller 58 may perform initial setting to control the guide laser beam wavefront adjuster 84, the both beam wavefront adjuster 81, and the second both beam wavefront adjuster 82 (S2150). Then, the controller 58 may proceed to S2200. The operation from S2200 to S2600 may be similar to that of the first embodiment.

In S2500, when the above-described absolute value of the difference ΔWdg is equal to or smaller than a predetermined threshold ΔWdgr (S2500; YES), the controller 58 may proceed to S2700.

In S2700, the controller 58 may control the beam monitor 57, receive detection results from the beam monitor 57, and calculate a beam width Dg of the guide laser beam.

Then, the controller 58 may calculate a difference ΔDgt between the beam width Dg of the guide laser beam and a predetermined value Dt through the following expression (S2800).

$$\Delta Dgt = Dg - Dt$$

The predetermined value Dt may be a beam width of the guide laser beam such that, for example, a focused beam spot width of the laser beam becomes a desired value. The beam width of the guide laser beam may be changed by control of the wavefront by the guide laser beam wavefront adjuster 84, independently from the beam width of the laser beam. However, under the condition where the optical power of the guide laser beam wavefront adjuster 84 is determined, the beam width of the guide laser beam and the beam width of the laser beam may correspond to each other almost one-to-one. When the beam width of the laser beam is determined, the focused beam spot width of the laser beam may be determined. Then, the beam width of the guide laser beam where the focused beam spot width of the laser beam becomes a desired value may be stored in a storage memory 1005 (described later) in association with the optical power of the guide laser beam wavefront adjuster 84. The predetermined value Dt may be determined based on the data in the storage memory 1005 and the optical power of the guide laser beam wavefront adjuster 84.

Then, the controller 58 may determine whether or not an absolute value of the difference ΔDgt calculated in S2800 is equal to or smaller than a predetermined threshold ΔDgtr (S2900). The predetermined threshold ΔDgtr may be a positive value.

When the absolute value of the difference ΔDgt is not equal to or smaller than the predetermined threshold ΔDgtr (S2900; NO), the controller 58 may control the both beam wavefront adjuster 81 so that the difference ΔDgt approaches 0 (S3000). Then, the controller 58 may return to the above-described S2700 and repeat the subsequent steps.

When the absolute value of the difference ΔDgt is equal to or smaller than the predetermined threshold ΔDgtr (S2900; YES), the controller 58 may proceed to S3100. In S3100, the controller 58 may calculate the parameter Wg related to the wavefront of the guide laser beam, similarly to S2300. Then, the controller 58 may proceed to S3200. The operations in S3200 and the following S3300 may be similar to those of the first embodiment.

In S3300, when the above-described absolute value of the difference ΔWgt is not equal to or smaller than the predetermined threshold ΔWgtr (S3300; NO), the controller 58 may control the second both beam wavefront adjuster 82 so that the difference ΔWgt approaches 0 (S3450). Then, the controller 58 may return to the above-described S3100 and repeat the subsequent steps.

When the absolute value of the difference ΔWgt is equal to or smaller than the predetermined threshold ΔWgtr (S3300; YES), the controller 58 may proceed to S3600. The operations in S3600 and the following S3700 may be similar to those of the first embodiment.

During the period from termination of the processing in S2150 to termination of the processing in S3600, the target 27 may not be outputted from the target generation unit 26. During the period from the termination of the processing in S2150 to the termination of the processing in S3600, a laser beam may not be outputted from the laser system 3 except for the case in which the parameter Wd related to the wavefront of the laser beam is calculated in S2200. After the processing in S3600, the target 27 may be outputted from the target generation unit 26, and the laser beam may be outputted from the laser system 3, under the control of the EUV light generation controller 5.

In S3700, when a signal indicating termination of the control has been received from the EUV light generation controller 5 (S3700; YES), the controller 58 may terminate the control and finish the operation in this flowchart. When a signal indicating termination of the control has not been received (S3700; NO), the controller 58 may return to S2700 described above and repeat the subsequent steps. After the processing is returned from S3700 to S2700, the target 27 and the laser beam may be outputted while the subsequent processing from S2700 to S3700 is performed.

6.2.2 Initial Setting (Details of S2150)

Figure 20A:
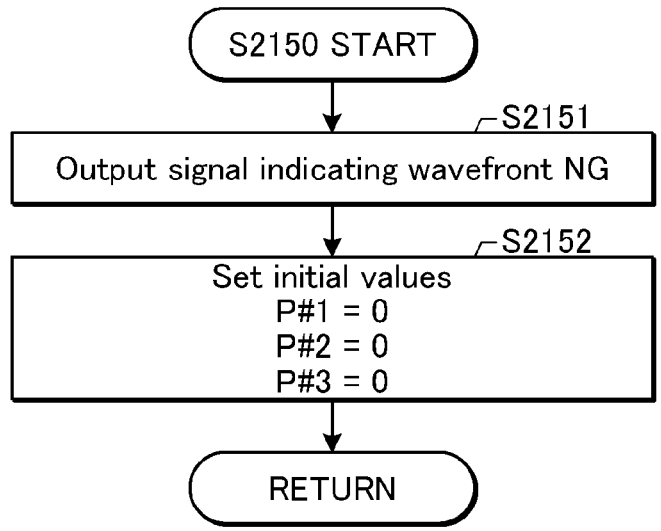
FIG. 20A is a flowchart showing the process for initial setting indicated in FIG. 19.

FIG. 20A is a flowchart showing the process for initial setting indicated in FIG. 19. The process shown in FIG. 20A may be carried out by the controller 58 as a subroutine in S2150 of FIG. 19.

First, the controller 58 may output a signal indicating non-completion of the control of the wavefront (wavefront NG) to the EUV light generation controller 5 (S2151). In this way, the EUV light generation controller 5 may stop output of the target 27 from the target generation unit 26 and stop output of the laser beam from the laser system 3.

Subsequently, the controller 58 may set initial values (S2152). To be more specific, the current values P#1, P#2 of the above-described optical power, and the current value P#3 of the optical power of the second both beam wavefront adjuster 82 may be set to 0.

After S2152, the controller 58 may terminate the operation in this flow chart.

6.2.3 Calculation of Dg (Details of S2700)

Figure 20B:
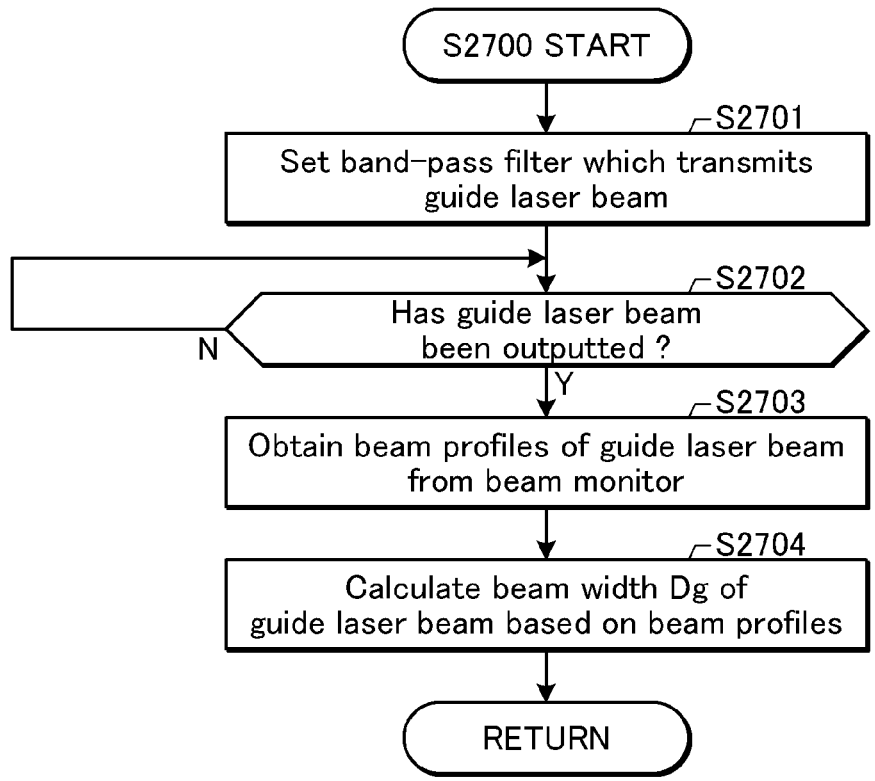
FIG. 20B is a flowchart showing the process for calculating a beam width of the guide laser beam indicated in FIG. 19.

FIG. 20B is a flowchart showing the process for calculating a beam width Dg of the guide laser beam shown in FIG. 19. The process shown in FIG. 20B may be carried out by the controller 58 as a subroutine in S2700 of FIG. 19.

First, the controller 58 may control the beam monitor 57 and set the above-described second band-pass filter included in the beam monitor 57 (S2701).

Then, the controller 58 may determine whether or not the guide laser beam has been outputted from the guide laser device 40 (S2702). When the guide laser beam has not been outputted (S2702; NO), the controller 58 may stand by until the guide laser beam is outputted from the guide laser device 40. When the guide laser beam has been outputted (S2702; YES), the controller 58 may proceed to S2703.

In S2703, the controller 58 may obtain beam profiles of the guide laser beam from the beam monitor 57.

Next, the controller 58 may calculate a beam width Dg of the guide laser beam based on the beam profiles obtained in S2703 (S2704), and terminate the operation in this flowchart.

6.2.4 Control of Both Beam Wavefront Adjuster (Details of S3000)

Figure 20C:
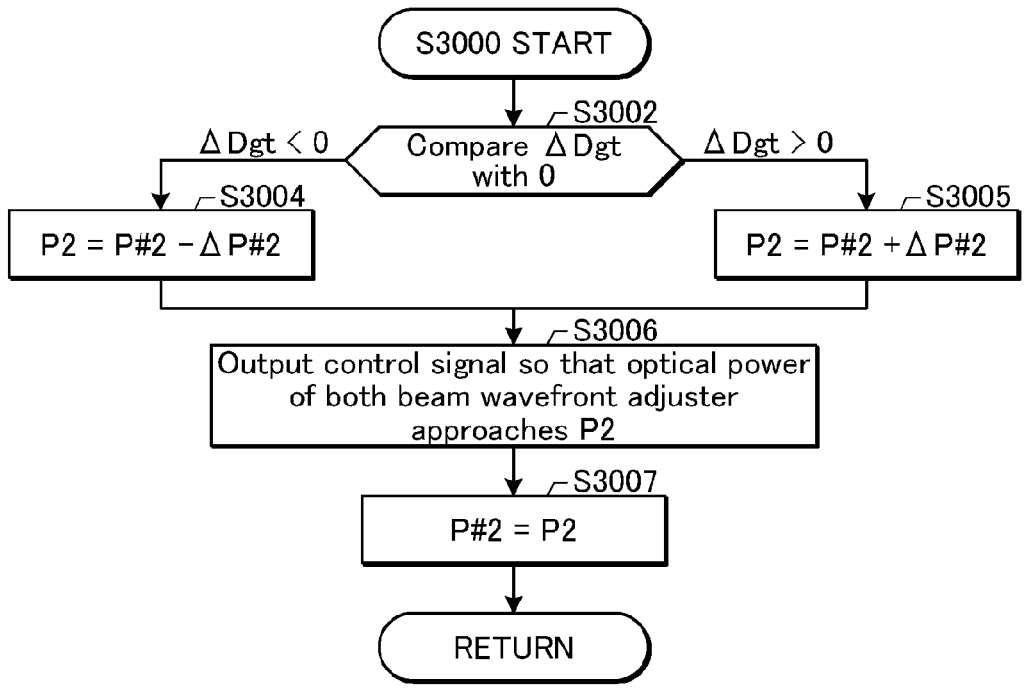
FIG. 20C is a flowchart showing the process for controlling the both beam wavefront adjuster indicated in FIG. 19.

FIG. 20C is a flowchart showing the process for controlling the both beam wavefront adjuster 81 indicated in FIG. 19. The process shown in FIG. 20C may be carried out by the controller 58 as a subroutine in S3000 of FIG. 19. The controller 58 may first compare the above-described difference ΔDgt with 0 (S3002).

In S3002, when the difference ΔDgt is smaller than 0 (ΔDgt<0), the controller 58 may proceed to S3004. In S3004, a value obtained by subtracting a predetermined constant ΔP#2 from the current value P#2 of the optical power set in the both beam wavefront adjuster 81 may be set as a target optical power P2.

In S3002, when the difference ΔDgt is greater than 0 (ΔDgt>0), the controller 58 may proceed to S3005. In S3005, a value obtained by adding the predetermined constant ΔP#2 to the current value P#2 of the optical power set in the both beam wavefront adjuster 81 may be set as the target optical power P2. The predetermined constant ΔP#2 may be a positive value.

Then, the controller 58 may output a control signal to the both beam wavefront adjuster 81 so that the optical power of the both beam wavefront adjuster 81 approaches the target optical power P2 (S3006).

Next, the controller 58 may store the above-described P2 in the memory 1002 (described later) as a current value P#2 of the optical power of the both beam wavefront adjuster 81 (S3007), and terminate the operation in this flowchart.

6.2.5 Control of Second Both Beam Wavefront Adjuster (Details of S3450)

Figure 20D:
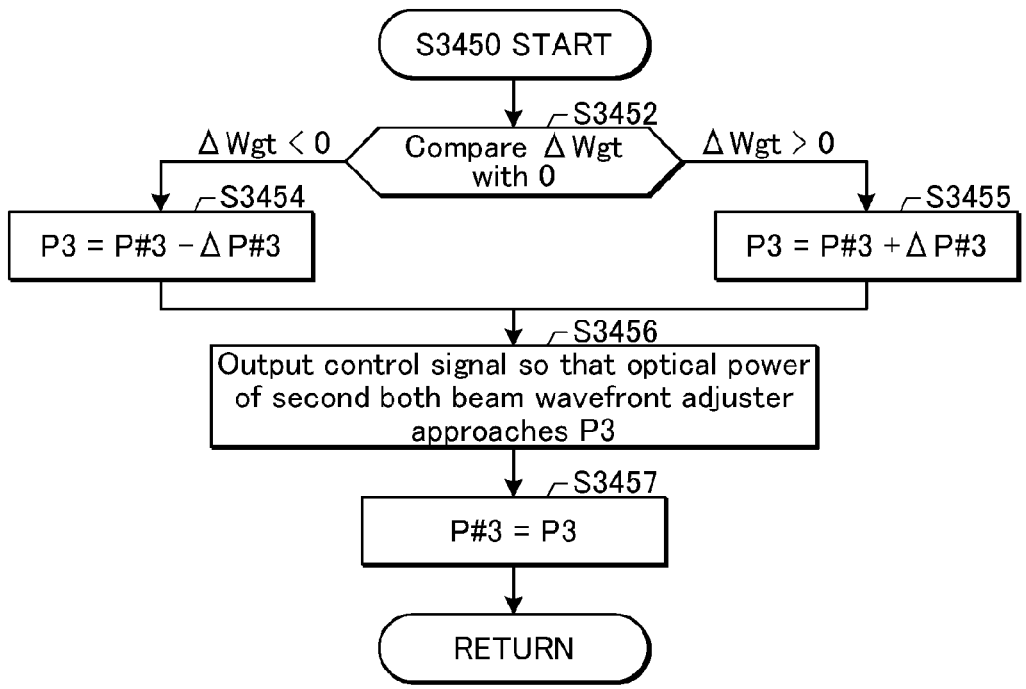
FIG. 20D is a flowchart showing the process for controlling the second both beam wavefront adjuster indicated in FIG. 19.

FIG. 20D is a flowchart showing the process for controlling the second both beam wavefront adjuster 82 shown in FIG. 19. The process shown in FIG. 20D may be carried out by the controller 58 as a subroutine in S3450 of FIG. 19. The controller 58 may first compare the above-described difference ΔWgt with 0 (S3452).

In S3452, when the difference ΔWgt is smaller than 0 (ΔWgt<0), the controller 58 may proceed to S3454. In S3454, a value obtained by subtracting a predetermined constant ΔP#3 from the current value P#3 of the optical power set in the second both beam wavefront adjuster 82 may be set as a target optical power P3.

In S3452, when the difference ΔWgt is greater than 0 (ΔWgt>0), the controller 58 may proceed to S3455. In S3455, a value obtained by adding the predetermined constant ΔP#3 to the current value P#3 of the optical power set in the second both beam wavefront adjuster 82 may be set as the target optical power P3. The predetermined constant ΔP#3 may be a positive value.

Then, the controller 58 may output a control signal to the second both beam wavefront adjuster 82 so that the optical power of the second both beam wavefront adjuster 82 approaches the target optical power P3 (S3456).

Next, the controller 58 may store the above-described P3 in the memory 1002 (described later) as a current value P#3 of the optical power of the second both beam wavefront adjuster 82 (S3457), and terminate the operation in this flowchart.

7. Laser System (Fifth Embodiment)

Figure 21:
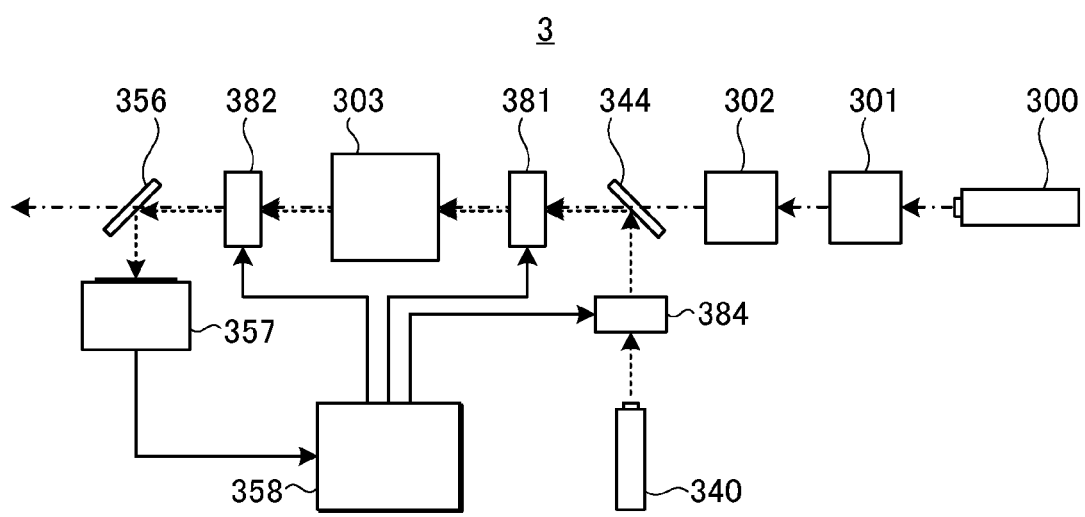
FIG. 21 schematically illustrates an exemplary configuration of a laser system included in an EUV light generation system according to a fifth embodiment of the present disclosure.

FIG. 21 schematically illustrates an exemplary configuration of a laser system included in an EUV light generation system according to a fifth embodiment of the present disclosure. In FIG. 21, the illustration of the EUV light generation device is omitted. In the fifth embodiment, the laser system 3 may include a master oscillator 300 and a plurality of amplifiers 301 through 303.

The laser system 3 may further include a guide laser device 340, a guide laser beam wavefront adjuster 384, a beam combiner 344, and a both beam wavefront adjuster 381. The laser system 3 may still further include a second both beam wavefront adjuster 382, a beam splitter 356, a beam monitor 357, and a controller 358.

The guide laser device 340 may be provided such that a guide laser beam outputted from the guide laser device 340 is incident on the guide laser beam wavefront adjuster 384. The guide laser beam wavefront adjuster 384 may be provided in a beam path of the guide laser beam outputted from the guide laser device 340.

The master oscillator 300 may be configured to output a seed beam of a laser beam. The amplifier 301 may amplify the seed beam outputted from the master oscillator 300, and the amplifier 302 may further amplify the laser beam amplified in the amplifier 301 and outputted from the amplifier 301.

The beam combiner 344 may include a dichroic mirror. The laser beam outputted from the amplifier 302 may be incident on a first surface of the beam combiner 344 (surface on the right side of FIG. 21). The guide laser beam outputted from the guide laser beam wavefront adjuster 384 may be incident on a second surface of the beam combiner 344 (surface on the left side in FIG. 21). The beam combiner 344 may transmit the laser beam incident on the first surface with high transmittance and reflect the guide laser beam incident on the second surface with high reflectance. The beam combiner 344 may be arranged at a predetermined arrangement angle with respect to the beam paths of the laser beam and the guide laser beam so that the travel direction of the laser beam and the travel direction of the guide laser beam substantially coincide with each other.

The both beam wavefront adjuster 381 may be provided in a beam path of the laser beam and the guide laser beam outputted from the beam combiner 344.

The amplifier 303 may transmit the laser beam and the guide laser beam outputted from the both beam wavefront adjuster 381. Here, the amplifier 303 may amplify at least the laser beam and transmit the laser beam.

The second both beam wavefront adjuster 382 may be provided in a beam path of the laser beam and the guide laser beam transmitted through the amplifier 303.

The beam splitter 356 may be provided in a beam path of the laser beam and the guide laser beam outputted from the second both beam wavefront adjuster 382. The beam splitter 356 may transmit at least the laser beam with high transmittance toward the beam delivery unit 50 (FIG. 2) and reflect a part of the laser beam and the guide laser beam as sample beams.

The beam monitor 357 may be positioned in a beam path of the sample beams including the laser beam and the guide laser beam reflected by the beam splitter 356.

The configurations of the guide laser device 340, the guide laser beam wavefront adjuster 384, the beam combiner 344, and the both beam wavefront adjuster 381 may be similar to the configurations of the guide laser device 40, the guide laser beam wavefront adjuster 84, the beam combiner 44, and the both beam wavefront adjuster 81, respectively, which are described above. The configurations of the second both beam wavefront adjuster 382, the beam splitter 356, and the beam monitor 357 may be similar to the configurations of the second both beam wavefront adjuster 82, the beam splitter 56, and the beam monitor 57, respectively, which are described above.

The controller 358 may control the guide laser beam wavefront adjuster 384, the both beam wavefront adjuster 381, and the second both beam wavefront adjuster 382 based on detection results outputted from the beam monitor 357. The function of the controller 358 may be similar to the function of the controller 58 described in the fourth embodiment.

In the fifth embodiment, the second both beam wavefront adjuster 382 may not be provided. In this case, the function of the controller 358 may be similar to the function of the controller 58 described in the first embodiment.

According to the fifth embodiment, even while the laser beam is not outputted from the master oscillator 300, the controller 358 may be capable of controlling the guide laser beam wavefront adjuster 384, the both beam wavefront adjuster 381, and the second both beam wavefront adjuster 382 based on the parameter related to the wavefront of the guide laser beam. In this way, the wavefront of the laser beam can be controlled to a predetermined range even at the beginning of the output of the laser beam.

8. Configuration of Controller

Figure 22:
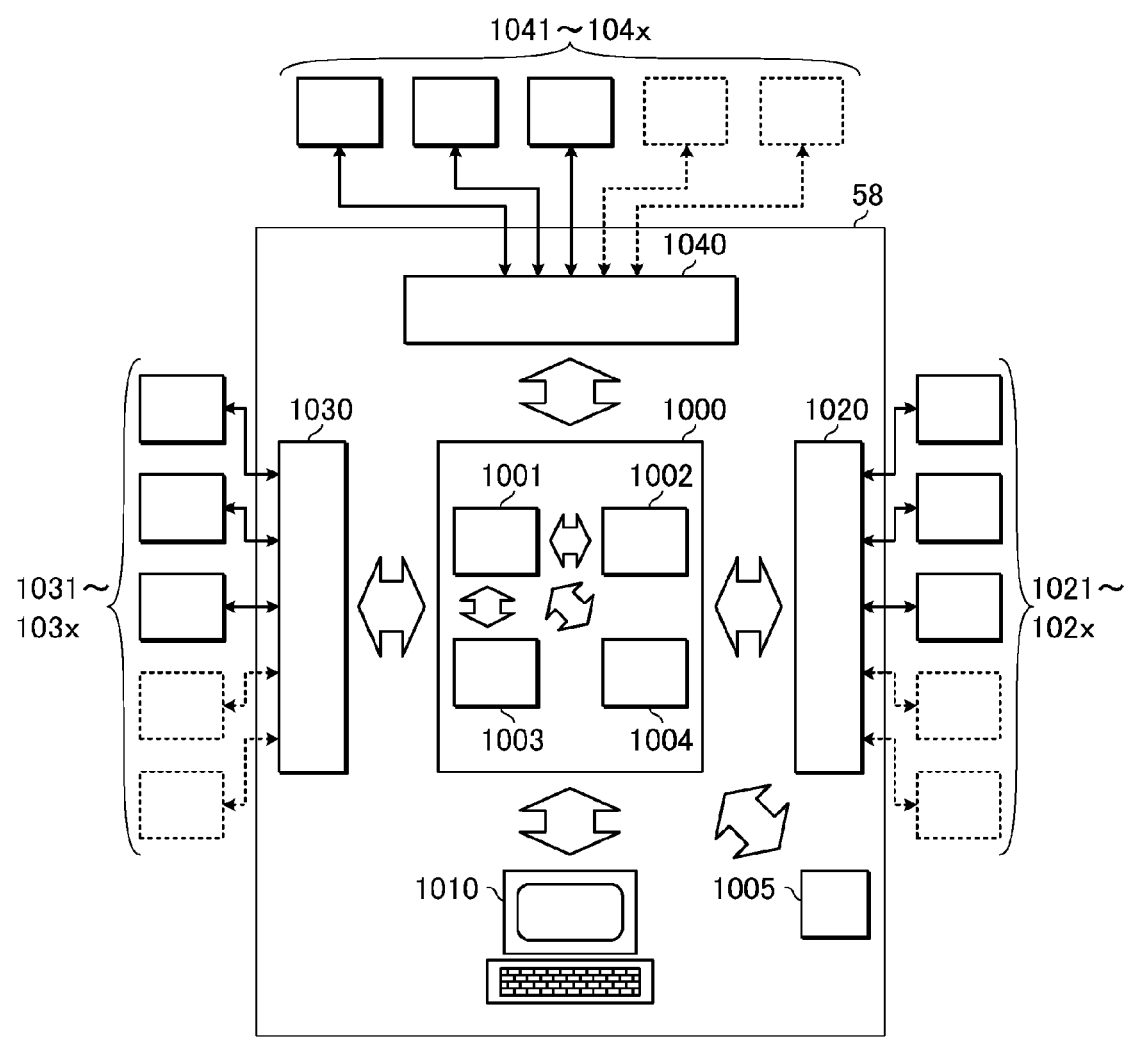
FIG. 22 is a block diagram illustrating a schematic configuration of a controller.

FIG. 22 is a block diagram schematically illustrating an exemplary configuration of the controller 58.

The controller 58 in the above-described embodiments may be constituted by a general-purpose control device such as a computer or a programmable controller. For example, the controller 58 may be constituted as described below.

(Configuration)

The controller may include a processing unit 1000, and a storage memory 1005, a user interface 1010, a parallel input/output (I/O) controller 1020, a serial I/O controller 1030, and an analog-to-digital (A/D) and digital-to-analog (D/A) converter 1040 that are connected to the processing unit 1000. The processing unit 1000 may include a central processing unit (CPU) 1001, and a memory 1002, a timer 1003, and a graphics processing unit (GPU) 1004 that are connected to the CPU 1001.

(Operation)

The processing unit 1000 may read out programs stored in the storage memory 1005. The processing unit 1000 may execute read-out programs, read out data from the storage memory 1005 in accordance with the execution of the programs, or store data in the storage memory 1005.

The parallel I/O controller 1020 may be connected to devices 1021 to 102x communicable through parallel I/O ports. The parallel I/O controller 1020 may control communication using digital signals through parallel I/O ports that is performed in the process where the processing unit 1000 executes programs.

The serial I/O controller 1030 may be connected to devices 1031 to 103x communicable through serial I/O ports. The serial I/O controller 1030 may control communication using digital signals through serial I/O ports that is performed in the process where the processing unit 1000 executes programs.

The A/D and D/A converter 1040 may be connected to devices 1041 to 104x communicable through analog ports. The A/D and D/A converter 1040 may control communication using analog signals through analog ports that is performed in the process where the processing unit 1000 executes programs.

The user interface 1010 may be configured to display progress of executing programs by the processing unit 1000 to an operator or to receive instructions by the operator to the processing unit 1000 to stop execution of the programs or to execute interruption processing.

The CPU 1001 of the processing unit 1000 may perform arithmetic processing of programs. In the process where the CPU 1001 executes programs, the memory 1002 may temporally store programs or temporally store data in the arithmetic process. The timer 1003 may measure time or elapsed time to output the time or the elapsed time to the CPU 1001 in accordance with the execution of the programs. When image data is input to the processing unit 1000, the GPU 1004 may process the image data in accordance with the execution of the programs and output the results to the CPU 1001.

The devices 1021 to 102x communicable through parallel I/O ports, which are connected to the parallel I/O controller 1020, may be the EUV light generation controller 5, another controller, or the like.

The devices 1031 to 103x communicable through serial I/O ports, which are connected to the serial I/O controller 1030, may be the guide laser device 40, the beam monitor 57, the both beam wavefront adjuster 81, the second both beam wavefront adjuster 82, the laser beam wavefront adjuster 83, the guide laser beam wavefront adjuster 84, or the like.

The devices 1041 to 104x communicable through analog ports, which are connected to the A/D and D/A converter 1040, may be various sensors such as a temperature sensor, a pressure sensor, and a vacuum gauge.

With the above-described configuration, the controller 58 may be capable of achieving the operation illustrated in the flowchart.

The above-described embodiments and the modifications thereof are merely examples for implementing the present disclosure, and the present disclosure is not limited to these examples. Making various modifications according to the specifications is within the scope of the present disclosure, and other various modifications are possible within the scope of the present disclosure. The modifications illustrated for one of the embodiments can be applied to other embodiments as well (including the other embodiments described herein).

The terms used in the entirety of this specification and the appended claims should be interpreted as "non-limiting" terms. For example, the terms "include" and "be included" should be interpreted as "including the stated elements but not limited to the stated elements." The term "have" should be interpreted as "having the stated elements but not limited to the stated elements." Further, the modifier "one (a/an)" should be interpreted as "at least one" or "one or more."

The invention claimed is:

1. A laser beam controlling device, comprising:
a guide laser device configured to output a guide laser beam;
a guide laser beam wavefront adjuster provided in a beam path of the guide laser beam outputted from the guide laser device;
a beam combiner configured to adjust a travel direction of a laser beam outputted from a laser system and a travel direction of the guide laser beam outputted from the guide laser beam wavefront adjuster to coincide with each other;
a both beam wavefront adjuster provided in a beam path of both the laser beam outputted from the beam combiner and the guide laser beam outputted from the beam combiner;
a beam monitor provided in a beam path of both the laser beam outputted from the both beam wavefront adjuster and the guide laser beam outputted from the both beam wavefront adjuster; and
a controller configured to control the guide laser beam wavefront adjuster and the both beam wavefront adjuster based on detection results at the beam monitor with respect to both the laser beam outputted from the both beam wavefront adjuster and the guide laser beam outputted from the both beam wavefront adjuster.

2. The laser beam controlling device according to claim 1, wherein the controller is configured to control the guide laser beam wavefront adjuster based on detection results at the beam monitor with respect to both the laser beam outputted from the both beam wavefront adjuster and the guide laser beam outputted from the both beam wavefront adjuster, and control the both beam wavefront adjuster based on the detection results at the beam monitor with respect to the guide laser beam outputted from the both beam wavefront adjuster.

3. The laser beam controlling device according to claim 1, wherein the controller is configured to control the guide laser beam wavefront adjuster such that detection results related to wavefronts at the beam monitor, with respect to both the laser beam outputted from the both beam wavefront adjuster and the guide laser beam outputted from the both beam wavefront adjuster, substantially coincide with each other, and then control the both beam wavefront adjuster such that the detection results related to the wavefront at the beam monitor, with respect to the guide laser beam outputted from the both beam wavefront adjuster, becomes a desired result.

4. A laser beam controlling device, comprising:
a guide laser device configured to output a guide laser beam;
a laser beam wavefront adjuster provided in a beam path of a laser beam outputted from a laser system;
a beam combiner configured to adjust a travel direction of the laser beam outputted from the laser beam wavefront adjuster and a travel direction of the guide laser beam outputted from the guide laser device to substantially coincide with each other;
a both beam wavefront adjuster provided in a beam path of both the laser beam outputted from the beam combiner and the guide laser beam outputted from the beam combiner;
a beam monitor provided in a beam path of both the laser beam outputted from the both beam wavefront adjuster and the guide laser beam outputted from the both beam wavefront adjuster; and
a controller configured to control the laser beam wavefront adjuster and the both beam wavefront adjuster based on detection results at the beam monitor with respect to both the laser beam outputted from the both beam wavefront adjuster and the guide laser beam outputted from the both beam wavefront adjuster.

5. The laser beam controlling device according to claim 4, wherein the controller is configured to control the laser beam wavefront adjuster based on detection results at the beam monitor with respect to both the laser beam outputted from the both beam wavefront adjuster and the guide laser beam outputted from the both beam wavefront adjuster, and control the both beam wavefront adjuster based on the detection results at the beam monitor with respect to the guide laser beam outputted from the both beam wavefront adjuster.

6. The laser beam controlling device according to claim 4, wherein the controller is configured to control the laser beam wavefront adjuster such that detection results related to wavefronts at the beam monitor, with respect to both the laser beam outputted from the both beam wavefront adjuster and the guide laser beam outputted from the both beam wavefront adjuster, substantially coincide with each other, and then control the both beam wavefront adjuster such that the detection results related to the wavefront at the beam monitor, with respect to the guide laser beam outputted from the both beam wavefront adjuster, becomes a desired result.

7. A laser beam controlling device, comprising:
a guide laser device configured to output a guide laser beam;
a guide laser beam wavefront adjuster provided in a beam path of the guide laser beam outputted from the guide laser device;
a laser beam wavefront adjuster provided in a beam path of a laser beam outputted from a laser system;
a beam combiner configured to adjust a travel direction of the laser beam outputted from the laser beam wavefront adjuster and a travel direction of the guide laser beam outputted from the guide laser beam wavefront adjuster to substantially coincide with each other;
a beam monitor provided in a beam path of both the laser beam outputted from the beam combiner and the guide laser beam outputted from the beam combiner; and
a controller configured to control the guide laser beam wavefront adjuster and the laser beam wavefront adjuster based on detection results at the beam monitor with respect to both the laser beam outputted from the beam combiner and the guide laser beam outputted from the beam combiner.

8. The laser beam controlling device according to claim 7, wherein the controller is configured to control at least one of the guide laser beam wavefront adjuster and the laser beam wavefront adjuster based on detection results at the beam monitor with respect to both the laser beam outputted from the beam combiner and the guide laser beam outputted from the beam combiner, and control the guide laser beam wavefront adjuster and the laser beam wavefront adjuster based on the detection results at the beam monitor with respect to the guide laser beam outputted from the beam combiner.

9. The laser beam controlling device according to claim 7, wherein the controller is configured to control at least one of the guide laser beam wavefront adjuster and the laser beam wavefront adjuster such that detection results related to wavefronts at the beam monitor, with respect to both the laser beam outputted from the beam combiner and the guide laser beam outputted from the beam combiner, substantially coincide with each other, and then control an optical power of the guide laser beam wavefront adjuster by a given amount such that the detection results related to the wavefront at the beam monitor with respect to the guide laser beam outputted from the beam combiner becomes a desired result, and control an optical power of the laser beam wavefront adjuster by the given amount.

10. An extreme ultraviolet light generating apparatus, comprising:
a laser beam controlling device, including
a guide laser device configured to output a guide laser beam,
a guide laser beam wavefront adjuster provided in a beam path of the guide laser beam outputted from the guide laser device,
a beam combiner configured to adjust a travel direction of a laser beam outputted from a laser system and a travel direction of the guide laser beam outputted from the guide laser beam wavefront adjuster to substantially coincide with each other,
a both beam wavefront adjuster provided in a beam path of both the laser beam outputted from the beam combiner and the guide laser beam outputted from the beam combiner,
a beam monitor provided in a beam path of both the laser beam outputted from the both beam wavefront adjuster and the guide laser beam outputted from the both beam wavefront adjuster, and a controller configured to control the guide laser beam wavefront adjuster and the both beam wavefront adjuster based on detection results at the beam monitor with respect to both the laser beam outputted from the both beam wavefront adjuster and the guide laser beam outputted from the both beam wavefront adjuster;

a chamber provided with an inlet to allow the laser beam outputted from the laser beam controlling device to enter therethrough;

a target generation unit configured to output a target into the chamber; and a laser beam focusing optical system configured to focus the laser beam in the chamber.

11. An extreme ultraviolet light generating apparatus, comprising:
a laser beam controlling device, including
a guide laser device configured to output a guide laser beam,
a laser beam wavefront adjuster provided in a beam path of a laser beam outputted from a laser system,
a beam combiner configured to adjust a travel direction of the laser beam outputted from the laser beam wavefront adjuster and a travel direction of the guide laser beam outputted from the guide laser device to substantially coincide with each other,
a both beam wavefront adjuster provided in a beam path of both the laser beam outputted from the beam combiner and the guide laser beam outputted from the beam combiner,
a beam monitor provided in a beam path of both the laser beam outputted from the both beam wavefront adjuster and the guide laser beam outputted from the both beam wavefront adjuster, and
a controller configured to control the laser beam wavefront adjuster and the both beam wavefront adjuster based on detection results at the beam monitor with respect to both the laser beam outputted from the both beam wavefront adjuster and the guide laser beam outputted from the both beam wavefront adjuster;

a chamber provided with an inlet to allow the laser beam outputted from the laser beam controlling device to enter therethrough;

a target generation unit configured to output a target into the chamber; and a laser beam focusing optical system configured to focus the laser beam in the chamber.

12. An extreme ultraviolet light generating apparatus, comprising:
a laser beam controlling device, including
a guide laser device configured to output a guide laser beam,
a guide laser beam wavefront adjuster provided in a beam path of the guide laser beam outputted from the guide laser device,
a laser beam wavefront adjuster provided in a beam path of a laser beam outputted from a laser system,
a beam combiner configured to adjust a travel direction of the laser beam outputted from the laser beam wavefront adjuster and a travel direction of the guide laser beam outputted from the guide laser beam wavefront adjuster to substantially coincide with each other,
a beam monitor provided in a beam path of both the laser beam outputted from the beam combiner and the guide laser beam outputted from the beam combiner, and
a controller configured to control the guide laser beam wavefront adjuster and the laser beam wavefront adjuster based on detection results at the beam monitor with respect to both the laser beam outputted from the beam combiner and the guide laser beam outputted from the beam combiner;

a chamber provided with an inlet to allow the laser beam outputted from the laser beam controlling device to enter therethrough;

a target generation unit configured to output a target into the chamber; and a laser beam focusing optical system configured to focus the laser beam in the chamber.

* * * * *